(12) United States Patent
Sun et al.

(10) Patent No.: US 12,470,462 B2
(45) Date of Patent: Nov. 11, 2025

(54) COMMUNICATION METHOD AND COMMUNICATION APPARATUS FOR OPTIMIZING SESSION ESTABLISHMENT IN WIRELESS NETWORKS USING NETWORK SLICE INFORMATION

(71) Applicant: HUAWEI TECHNOLOGIES CO., LTD., Guangdong (CN)

(72) Inventors: Fei Sun, Shanghai (CN); Haiyan Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 17/993,946

(22) Filed: Nov. 24, 2022

(65) Prior Publication Data

US 2023/0086410 A1  Mar. 23, 2023

Related U.S. Application Data

(63) Continuation of application No. PCT/CN2021/094053, filed on May 17, 2021.

(30) Foreign Application Priority Data

May 28, 2020 (CN) .......................... 202010466918.0

(51) Int. Cl.
*G06F 15/16* (2006.01)
*H04L 41/0895* (2022.01)
*H04L 67/141* (2022.01)

(52) U.S. Cl.
CPC ........ *H04L 41/0895* (2022.05); *H04L 67/141* (2013.01)

(58) Field of Classification Search
CPC .......................... H04L 67/141; H04L 41/0895
See application file for complete search history.

(56) References Cited

U.S. PATENT DOCUMENTS

2018/0199240 A1*  7/2018  Dao ................. H04L 65/1069
2018/0288654 A1* 10/2018  Shih ..................... H04W 48/14
(Continued)

FOREIGN PATENT DOCUMENTS

CN       109561485 A      4/2019
CN       109862579 A      6/2019
(Continued)

OTHER PUBLICATIONS

NEC, KI#7 New Sol#X: Steering the UE to a network slice in a different frequency band. 3GPP TSG-SA WG2 Meeting #139E, Jun. 1-12, 2020, Electronic, Elbonia, S2-2003629, 3 pages.
(Continued)

*Primary Examiner* — Razu A Miah
(74) *Attorney, Agent, or Firm* — WOMBLE BOND DICKINSON (US) LLP

(57) ABSTRACT

This application provides a communication method and a communication apparatus where a terminal device receives information about supported and allowed network slices and processes a session establishment request based on this information to optimize network efficiency and service delivery. The terminal device receives first information that indicates at least one supported network slice, which includes a network slice supported by at least a first cell or a network slice supported by a first access device. The first cell includes a cell currently accessed by the terminal device, and the first access device includes an access device currently accessed by the terminal device; the terminal device receives second information that indicates at least one allowed network slice; and the terminal device processes a session establishment request of a first service based on the first information and the second information to reduce a waste of resources.

18 Claims, 7 Drawing Sheets

(56) References Cited

U.S. PATENT DOCUMENTS

| | | | | |
|---|---|---|---|---|
| 2018/0359795 A1* | 12/2018 | Baek | .................. | H04L 67/14 |
| 2019/0029065 A1 | 1/2019 | Park et al. | | |
| 2019/0158360 A1* | 5/2019 | Xu | .................. | H04W 24/02 |
| 2019/0320314 A1* | 10/2019 | Yang | .................. | H04W 40/12 |
| 2020/0137675 A1* | 4/2020 | Park | .................. | H04W 68/005 |

FOREIGN PATENT DOCUMENTS

| | | |
|---|---|---|
| CN | 109906630 A | 6/2019 |
| CN | 110391926 A | 10/2019 |
| WO | 2018083664 A1 | 5/2018 |
| WO | 2021168647 A1 | 9/2021 |

OTHER PUBLICATIONS

LG Electronics Inc., "Consideration on Allowed NSSAI in NG-RAN", 3GPP TSG-RAN WG3 Meeting #100 R3-183063, May 25, 2018, total 7 pages.

\* cited by examiner

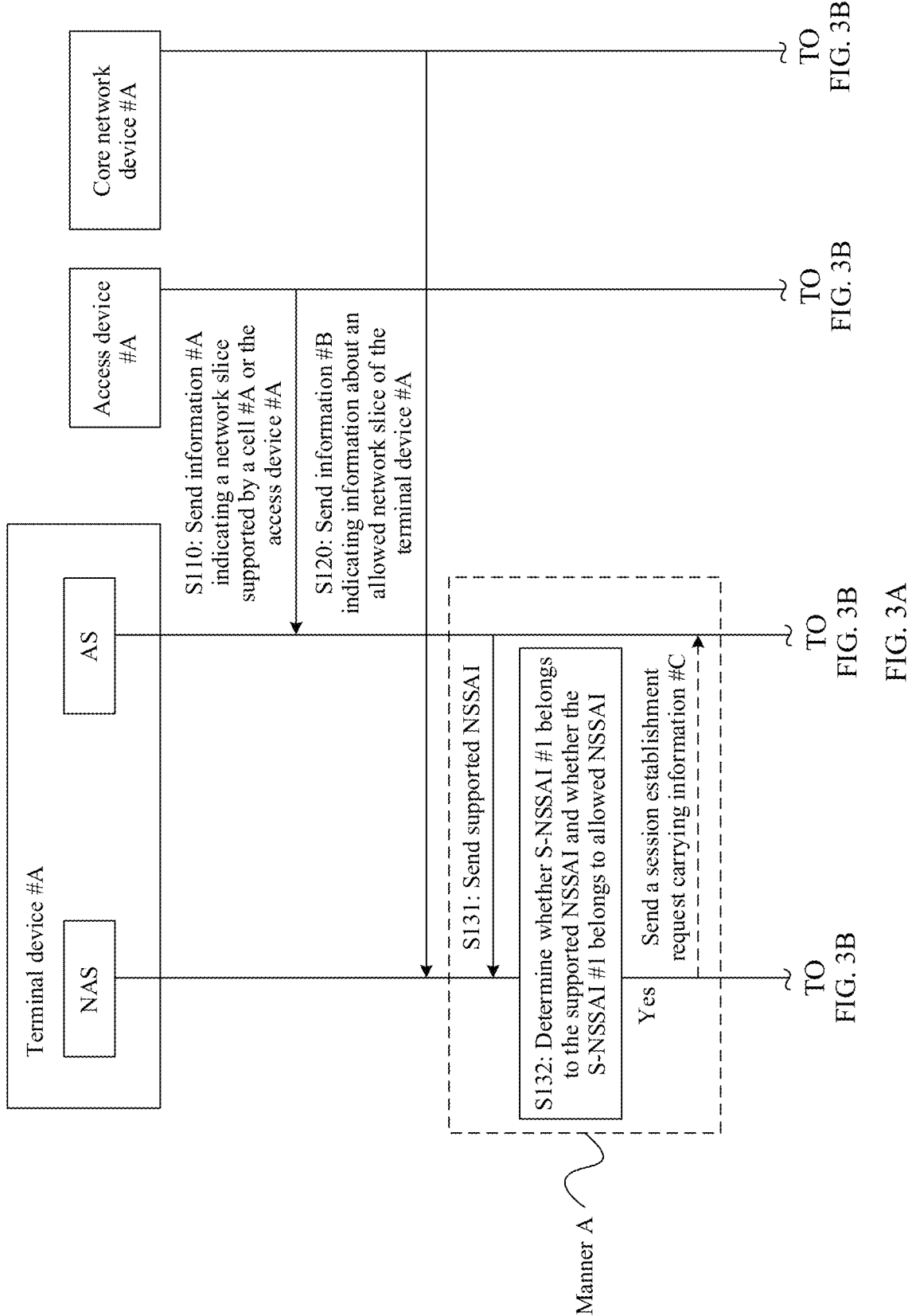

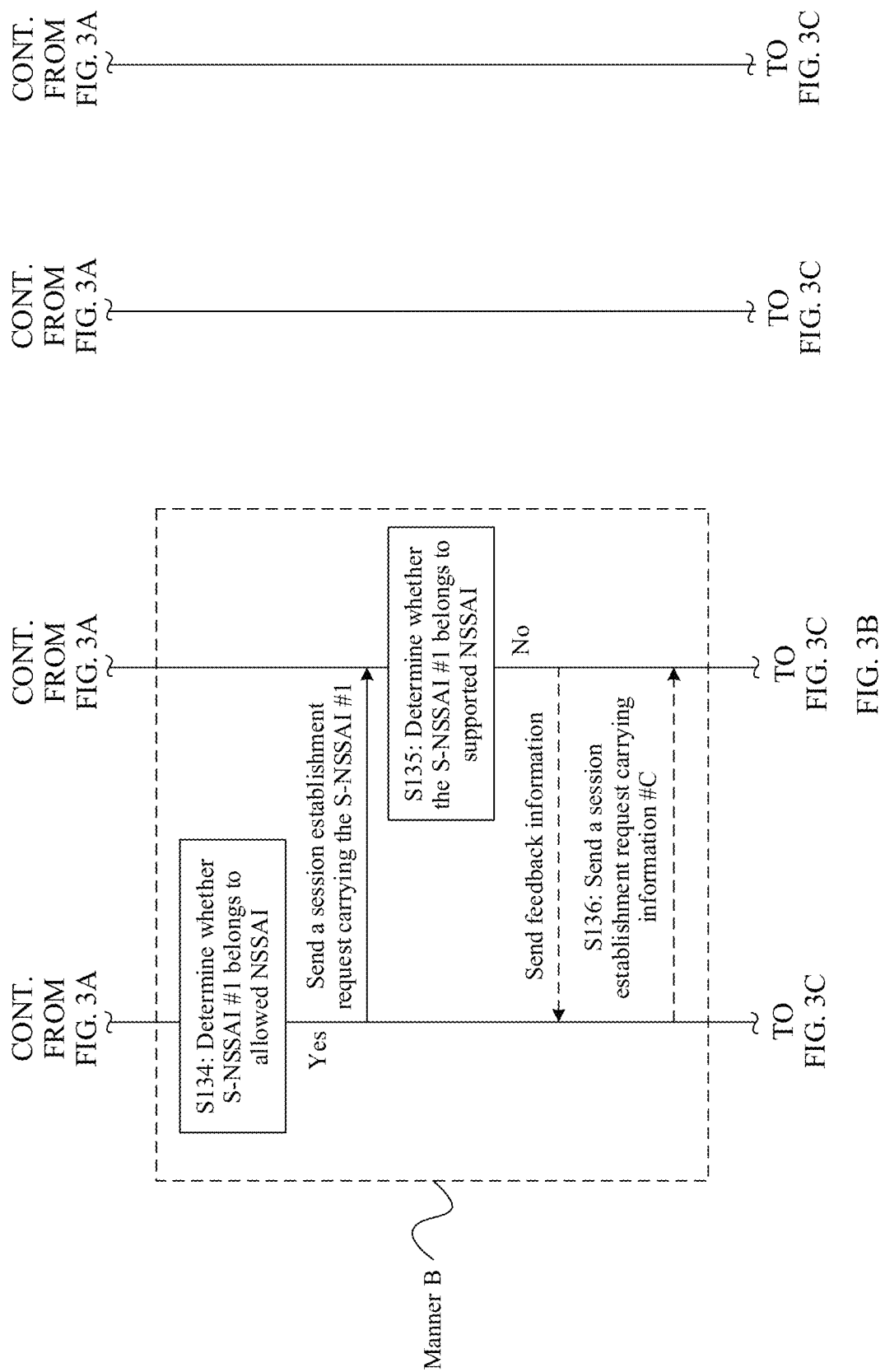

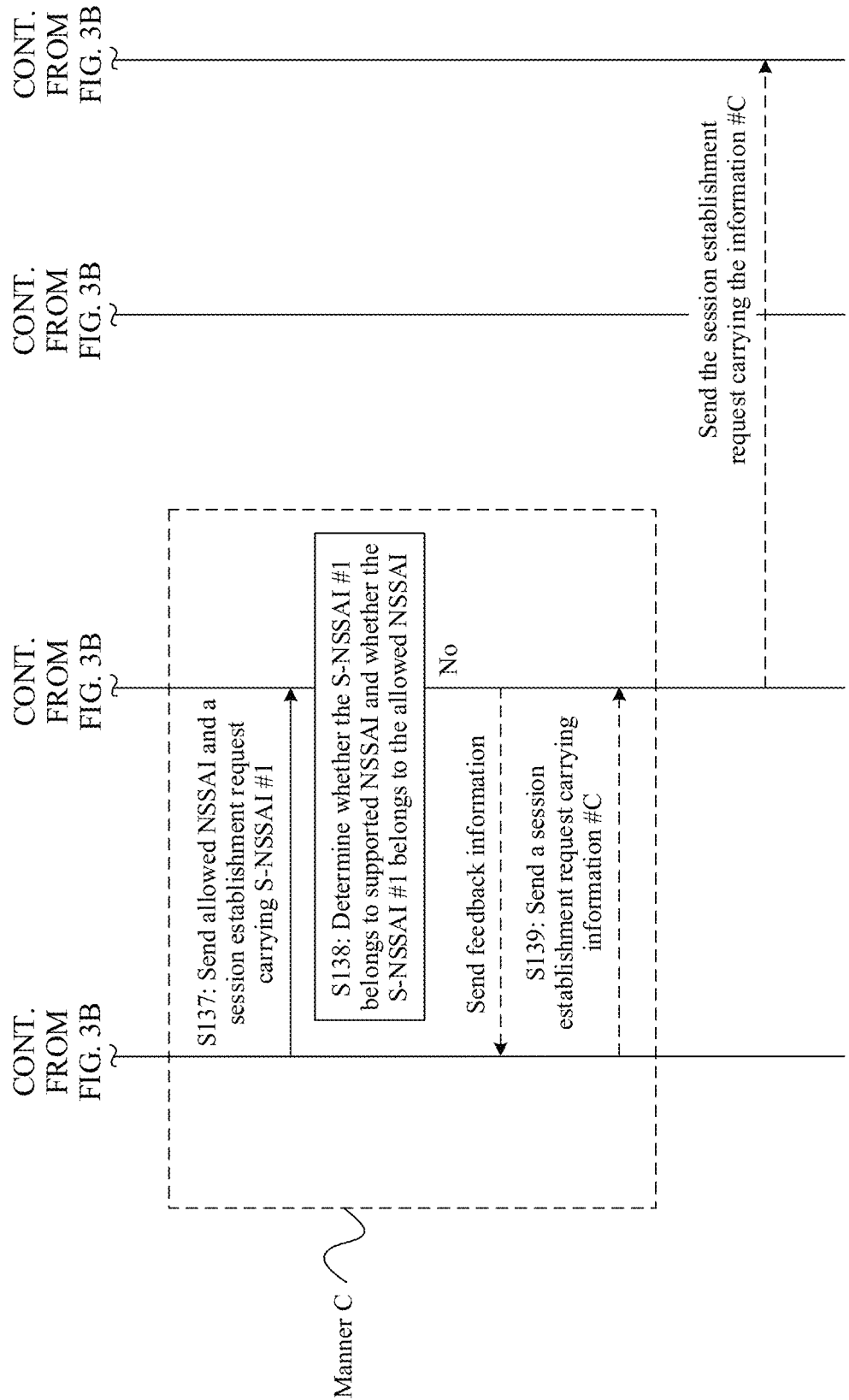

COMMUNICATION METHOD AND COMMUNICATION APPARATUS FOR OPTIMIZING SESSION ESTABLISHMENT IN WIRELESS NETWORKS USING NETWORK SLICE INFORMATION

CROSS-REFERENCE TO RELATED APPLICATIONS

This application is a continuation of International Application No. PCT/CN2021/094053, filed on May 17, 2021, which claims priority to Chinese Patent Application No. 202010466918.0, filed on May 28, 2020. The disclosures of the aforementioned applications are hereby incorporated by reference in their entireties.

TECHNICAL FIELD

Embodiments of this application relate to the communication field, and more specifically, to a communication method and a communication apparatus.

BACKGROUND

Currently, in a known network slicing technology, a single physical network may be divided into a plurality of network slices (or virtual networks), and different network slices may provide different services, so that the single physical network can provide a plurality of services.

In this technology, when a terminal device needs to access a service, the terminal device may initiate a session of the service, for example, a protocol data unit (PDU) session. In addition, a session establishment request may carry an identifier of a network slice corresponding to the service.

Therefore, a network device may configure a resource for the terminal device based on the identifier of the network slice carried in the PDU session.

However, for example, when a cell in which the terminal device is currently located does not support the network slice or a network in which the terminal device is currently located does not allow the terminal device to use the network slice, a session connection cannot be established based on the session establishment request. Consequently, a waste of resources for transmission of the session establishment request is caused.

SUMMARY

This application provides a communication method and a communication apparatus, to reduce a waste of resources.

According to a first aspect, a communication method is provided. In an embodiment, a terminal device receives first information, where the first information indicates at least one supported network slice, the at least one supported network slice includes a network slice supported by a first cell and/or a network slice supported by a first access device, the first cell includes a cell currently accessed by the terminal device, and the first access device includes an access device currently accessed by the terminal device; the terminal device receives second information, where the second information indicates at least one allowed network slice; and the terminal device processes a session establishment request of a first service based on the first information and the second information.

In an embodiment, the terminal device obtains the first information indicating a network slice supported by the currently accessed cell or access device and the information indicating the allowed network slice of the terminal device, so that the terminal device can predetermine whether a network slice of a service that currently needs to be accessed belongs to information about the network slice supported by the currently accessed cell or access device and the allowed network slice. In this way, the terminal device can process the session establishment request based on a determining result, to reduce a waste of resources.

For example, in processing a session establishment request of a first service based on the first information and the second information, if a first network slice belongs to the at least one supported network slice, and the first network slice belongs to the at least one allowed network slice, the terminal device sends the session establishment request of the first service, where the first network slice includes a network slice corresponding to the first service.

Therefore, it can be ensured that a session of the first service can be carried in the first network slice, or it can be ensured that a network device can configure a resource for the terminal device based on the session establishment request and an identifier of the first network slice.

Alternatively, if a first network slice does not belong to the at least one supported network slice, or a first network slice does not belong to the at least one allowed network slice, the terminal device stops the session establishment request of the first service.

Because the terminal device cannot access a service #1 by using a network slice #1, the terminal device stops sending the session establishment request, to avoid the waste of the resources for transmission of the session establishment request.

Alternatively, if a first network slice does not belong to the at least one supported network slice, or a first network slice does not belong to the at least one allowed network slice, the terminal device sends third information, where the third information indicates at least one of the following: whether the first service supports network slice remapping, whether the first service supports network slice fallback, whether the terminal device supports cell redirection, information about at least one second cell, information about at least one second access device, and information about at least one second network slice; the second cell supports the first network slice; the second access device supports the first network slice; and the second network slice belongs to the supported network slice.

For example, when the third information indicates whether the first service supports (in other words, whether the first service supports or does not support) the network slice remapping, a network device (for example, a core network device) may determine, based on the third indication information, whether to perform processing in a manner of remapping the first service to another network slice (for example, a third network slice).

In an embodiment, the third network slice belongs to the allowed network slice, and the third network slice belongs to the network slice supported by the first cell or the first access device.

Therefore, a delay of accessing the first service by the terminal device can be reduced, and resource overheads caused when the core network device queries whether the first service supports the network slice remapping can be avoided.

For another example, when the third information indicates whether the first service supports the network slice fallback, a network device may determine, based on the third indication information, whether to perform processing in a manner of remapping the first service to a network slice (for example, a fourth network slice) that needs to be fallen back to.

The fourth network slice may be a network slice that is preconfigured by the network device for the terminal device and that is used for network slice fallback processing. In other words, the fourth network slice may be a target network slice that is preconfigured by the network device for the terminal device and that needs to be fallen back to during the network slice fallback processing.

In an embodiment, the third network slice belongs to the network slice supported by the first cell or the first access device.

Therefore, a delay of accessing the first service by the terminal device can be reduced, and resource overheads caused when a core network device queries whether the first service supports the network slice fallback can be avoided.

For another example, when the third information indicates whether the terminal device supports the cell redirection, a network device may determine, based on the third indication information, whether to perform processing in a manner of redirecting the terminal device to another cell (for example, a third cell).

In an embodiment, the third cell supports the first network slice.

Therefore, a delay of accessing the first service by the terminal device can be reduced, and resource overheads caused when a core network device queries whether the terminal device supports the cell redirection can be avoided.

For another example, when the third information indicates the information about the at least one second cell, where the second cell supports the first network slice, a network device may redirect the terminal device to the second cell based on the third indication information.

Therefore, the terminal device can access the first service in the second cell by using the first network slice, to reduce a delay of accessing the first service by the terminal device.

For another example, when the third information indicates the information about the at least one second access device, where the second access device supports the first network slice, a network device may redirect the terminal device to the second access device based on the third indication information.

Therefore, the terminal device can access the first service through the second access device by using the first network slice, to reduce a delay of accessing the first service by the terminal device.

For another example, when the third information indicates the information about the at least one second network slice, where the second network slice belongs to the supported network slice, a network device may remap the first service to the second network slice based on the third indication information.

Therefore, the terminal device can access the first service through the first access device by using the second network slice, to reduce a delay of accessing the first service by the terminal device.

In an embodiment, an access stratum AS of the terminal device receives the first information.

Alternatively, a non-access stratum NAS of the terminal device receives the second information.

In an embodiment, the AS of the terminal device sends information about the at least one supported network slice to the NAS of the terminal device; the NAS of the terminal device determines whether the first network slice belongs to the at least one supported network slice, where the first network slice includes the network slice corresponding to the first service; and the NAS of the terminal device determines whether the first network slice belongs to the at least one allowed network slice.

For example, if the first network slice belongs to the at least one supported network slice, and the first network slice belongs to the at least one allowed network slice, the NAS may generate the session establishment request of the first service, and send the session establishment request of the first service to the AS. The AS may send the session establishment request of the first service to the core network device (for example, through an access network device).

For another example, if the first network slice does not belong to the at least one supported network slice, and/or the first network slice belongs to the at least one allowed network slice, the NAS may not generate the session establishment request of the first service, or the NAS may stop sending the session establishment request of the first service to the AS.

For example, if the first network slice does not belong to the at least one supported network slice, and/or the first network slice belongs to the at least one allowed network slice, the NAS may generate the session establishment request of the first service, where the session establishment request carries the third information, and send the session establishment request of the first service to the AS. The AS may send the session establishment request of the first service to the core network device (for example, through an access network device).

The NAS performs determining, to reduce processing load of the AS.

In an embodiment, the NAS of the terminal device sends information about the first network slice to the AS of the terminal device, where the first network slice includes the network slice corresponding to the first service; if the first network slice belongs to the at least one allowed network slice, the NAS of the terminal device sends the session establishment request of the first service to the AS of the terminal device; and if the first network slice belongs to the at least one supported network slice, the AS of the terminal device sends the session establishment request of the first service.

Therefore, a delay between performing determining and sending the session establishment request can be reduced, and an effect of this application can be further improved.

For example, if the first network slice belongs to the at least one supported network slice, the AS may send the session establishment request of the first service to the core network device (for example, through an access network device).

For another example, if the first network slice does not belong to the at least one supported network slice, the AS may stop sending the session establishment request of the first service.

Alternatively, if the first network slice does not belong to the at least one supported network slice, the AS may send feedback information to the NAS, and the NAS may no longer generate the session establishment request of the first service based on the feedback information, or the NAS may stop sending the session establishment request of the first service to the AS.

Alternatively, if the first network slice does not belong to the at least one supported network slice, the AS may send feedback information to the NAS. The NAS may generate the session establishment request of the first service based on the feedback information, where the session establishment request carries the third information, and send the session establishment request of the first service to the AS.

The AS may send the session establishment request of the first service to the core network device (for example, through an access network device).

In an embodiment, the NAS of the terminal device sends information about the first network slice to the AS of the terminal device, where the first network slice includes the network slice corresponding to the first service.

If the first network slice belongs to the at least one allowed network slice, the NAS of the terminal device sends the session establishment request of the first service to the AS of the terminal device.

If the first network slice does not belong to the at least one supported network slice, the AS of the terminal device sends feedback information to the NAS of the terminal device, where the feedback information indicates that the first network slice does not belong to the at least one supported network slice.

In this case, the NAS may no longer generate the session establishment request of the first service based on the feedback information, or the NAS may stop sending the session establishment request of the first service to the AS.

Alternatively, the NAS may generate the session establishment request of the first service based on the feedback information, where the session establishment request carries the third information, and send the session establishment request of the first service to the AS. The AS may send the session establishment request of the first service to the core network device (for example, through an access network device).

In an embodiment, the NAS of the terminal device sends information about the first network slice to the AS of the terminal device, where the first network slice includes the network slice corresponding to the first service; the NAS of the terminal device sends information about the at least one allowed network slice to the AS of the terminal device; and the NAS of the terminal device sends the session establishment request of the first service to the AS of the terminal device.

If the first network slice belongs to the at least one supported network slice, and the first network slice belongs to the at least one allowed network slice, the AS of the terminal device sends the session establishment request of the first service.

If the first network slice does not belong to the at least one supported network slice, or the first network slice does not belong to the at least one allowed network slice, the AS of the terminal device sends feedback information to the NAS of the terminal device, where the feedback information indicates that the first network slice does not belong to the at least one supported network slice.

In this case, the NAS may no longer generate the session establishment request of the first service based on the feedback information, or the NAS may stop sending the session establishment request of the first service to the AS.

Alternatively, the NAS may generate the session establishment request of the first service based on the feedback information, where the session establishment request carries the third information, and send the session establishment request of the first service to the AS. The AS may send the session establishment request of the first service to the core network device (for example, through an access network device).

The AS performs determining, to reduce processing load of the NAS.

According to a second aspect, a communication method is provided. In an embodiment, a core network device obtains indication information, where the indication information indicates at least one of the following: whether a first service corresponding to a terminal device supports network slice remapping, whether the first service supports network slice fallback, whether the terminal device supports cell redirection, information about at least one second cell, information about at least one second access device, and information about at least one second network slice; the second cell supports a first network slice; the second access device supports the first network slice; and the second network slice belongs to a supported network slice; and the core network device communicates with the terminal device based on the indication information.

In an embodiment, the core network device obtains the indication information, so that when a cell or an access device that is currently accessed by the terminal device does not support the first network slice corresponding to the first service that the terminal requests to access, the core network device controls the terminal device based on the indication information, to reduce resource overheads.

In an embodiment, the core network device receives the indication information from the terminal device.

Specifically, the terminal device may determine whether the currently accessed cell or access device supports the first network slice, and send the indication information when determining that the currently accessed cell or access device does not support the first network slice.

Alternatively, the terminal device may directly send the indication information to the core network device without performing determining.

In an embodiment, the indication information may be stored, as network slice subscription information of the terminal device, in a network device such as a unified data management (UDM) network element.

Therefore, the core network device may obtain the indication information from the network device such as the UDM.

In an embodiment, the core network device may further determine whether the currently accessed cell or access device supports the first network slice, and control the terminal device based on the indication information when determining that the currently accessed cell or access device does not support the first network slice.

In an embodiment, the core network device may use different processing manners based on specific content indicated by the indication information.

In an embodiment, the core network device determines, from a plurality of processing manners based on the indication information, a first processing manner that satisfies a case indicated by the indication information; and the core network device communicates with the terminal device based on the first processing manner.

The plurality of processing manners include at least two of the following processing manners.

Manner 1: Performing Network Slice Remapping on the First Service

In an embodiment, when the indication information indicates whether the first service supports (in other words, whether the first service supports or does not support) the network slice remapping, the network device (for example, the core network device) may determine, based on the third indication information, whether to perform processing in a manner of remapping the first service to another network slice (for example, a third network slice).

In an embodiment, the third network slice belongs to an allowed network slice, and the third network slice belongs to a network slice supported by a first cell or a first access device.

Therefore, a delay of accessing the first service by the terminal device can be reduced, and resource overheads caused when the core network device queries whether the first service supports the network slice remapping can be avoided.

Manner 2: Performing Network Slice Fallback on the First Service

In an embodiment, when the indication information indicates whether the first service supports the network slice fallback, the core network device may determine, based on the third indication information, whether to perform processing in a manner of remapping the first service to a network slice (for example, a fourth network slice) that needs to be fallen back to.

The fourth network slice may be a network slice that is preconfigured by the network device for the terminal device and that is used for network slice fallback processing. In other words, the fourth network slice may be a target network slice that is preconfigured by the network device for the terminal device and that needs to be fallen back to during the network slice fallback processing.

In an embodiment, the third network slice belongs to a network slice supported by a first cell or a first access device.

Therefore, a delay of accessing the first service by the terminal device can be reduced, and resource overheads caused when the core network device queries whether the first service supports the network slice fallback can be avoided.

Manner 3:
Performing Cell Redirection on the Terminal Device

In an embodiment, when the indication information indicates whether the terminal device supports the cell redirection, the core network device may determine, based on the third indication information, whether to perform processing in a manner of redirecting the terminal device to another cell (for example, a third cell).

In an embodiment, the third cell supports the first network slice.

Therefore, a delay of accessing the first service by the terminal device can be reduced, and resource overheads caused when the core network device queries whether the terminal device supports the cell redirection can be avoided.

Manner 4: Redirecting the Terminal Device to the Second Cell

In an embodiment, when the indication information indicates the information about the at least one second cell, where the second cell supports the first network slice, the core network device may redirect the terminal device to the second cell based on the third indication information.

Therefore, the terminal device can access the first service in the second cell by using the first network slice, to reduce a delay of accessing the first service by the terminal device.

Manner 5: Redirecting the Terminal Device to a Cell of the Second Access Device

In an embodiment, when the indication information indicates the information about the at least one second access device, where the second access device supports the first network slice, the core network device may redirect the terminal device to the second access device based on the third indication information.

Therefore, the terminal device can access the first service through the second access device by using the first network slice, to reduce a delay of accessing the first service by the terminal device.

Manner 6: Remapping the First Service to the Second Network Slice

In an embodiment, when the indication information indicates the information about the at least one second network slice, where the second network slice belongs to the supported network slice, the core network device may remap the first service to the second network slice based on the third indication information.

Therefore, the terminal device can access the first service through a first access device by using the second network slice, to reduce a delay of accessing the first service by the terminal device.

In an embodiment, the core network device determines the first processing manner based on the indication information and a priority of each of the plurality of processing manners.

In an embodiment, the indication information is carried in a session establishment request of the first service.

According to a third aspect, a communication method is provided. In an embodiment, a terminal device generates indication information, where the indication information indicates at least one of the following: whether a first service corresponding to the terminal device supports network slice remapping, whether the first service supports network slice fallback, whether the terminal device supports cell redirection, information about at least one second cell, information about at least one second access device, and information about at least one second network slice; the second cell supports a first network slice; the second access device supports the first network slice; and the second network slice belongs to a supported network slice; and the terminal device sends the indication information.

In an embodiment, the terminal device sends the indication information to a core network device, so that when a cell or an access device that is currently accessed by the terminal device does not support the first network slice corresponding to the first service that the terminal requests to access, the core network device controls the terminal device based on the indication information, to reduce resource overheads.

In an embodiment, before the terminal device sends the indication information, the terminal device receives first information, where the first information indicates at least one supported network slice, the at least one supported network slice includes a network slice supported by a first cell and/or a network slice supported by a first access device, the first cell includes the cell currently accessed by the terminal device, and the first access device includes the access device currently accessed by the terminal device; and
  determines, based on the first information, that the first network slice does not belong to the supported network slice.

In an embodiment, the indication information is carried in a session establishment request of the first service.

According to a fourth aspect, a communication apparatus is provided. The communication apparatus includes: a transceiver unit, configured to: receive first information, where the first information indicates at least one supported network slice, the at least one supported network slice includes a network slice supported by a first cell and/or a network slice supported by a first access device, the first cell includes a cell currently accessed by a terminal device, and the first access device includes an access device currently accessed by the terminal device; and receive, for the terminal device, second information, where the second information indicates at least one allowed network slice; and a processing unit, configured to process a session establishment request of a first service based on the first information and the second information.

In an embodiment, the terminal device obtains the first information indicating a network slice supported by the currently accessed cell or access device and the information indicating the allowed network slice of the terminal device, so that the terminal device can predetermine whether a network slice of a service that currently needs to be accessed belongs to information about the network slice supported by the currently accessed cell or access device and the allowed network slice. In this way, the terminal device can process the session establishment request based on a determining result, to reduce a service access delay and reduce resource overheads.

For example, the processing unit is configured to: if a first network slice belongs to the at least one supported network slice, and the first network slice belongs to the at least one allowed network slice, send the session establishment request of the first service, where the first network slice includes a network slice corresponding to the first service.

Alternatively, the processing unit is configured to: if a first network slice does not belong to the at least one supported network slice, or a first network slice does not belong to the at least one allowed network slice, stop the session establishment request of the first service.

Alternatively, the processing unit is configured to: if a first network slice does not belong to the at least one supported network slice, or a first network slice does not belong to the at least one allowed network slice, send third information, where the third information indicates at least one of the following: whether the first service supports network slice remapping, whether the first service supports network slice fallback, whether the terminal device supports cell redirection, information about at least one second cell, information about at least one second access device, and information about at least one second network slice; the second cell supports the first network slice; the second access device supports the first network slice; and the second network slice belongs to the supported network slice.

In an embodiment, the transceiver unit includes an AS processing unit and a NAS processing unit.

In an embodiment, the AS processing unit is configured to obtain the first information from the transceiver unit and parse the first information, and the NAS processing unit is configured to obtain the second information from the transceiver unit and parse the second information.

In an embodiment, the AS processing unit is configured to send information about the at least one supported network slice to the NAS processing unit. The NAS processing unit is configured to determine whether the first network slice belongs to the at least one supported network slice, where the first network slice includes the network slice corresponding to the first service. The NAS of the terminal device determines whether the first network slice belongs to the at least one allowed network slice.

In an embodiment, the NAS processing unit is configured to: if the first network slice belongs to the at least one supported network slice, and the first network slice belongs to the at least one allowed network slice, generate the session establishment request of the first service, and send the session establishment request of the first service to the AS processing unit. The AS processing unit is configured to control the transceiver unit to send the session establishment request of the first service to a core network device (for example, through an access network device).

In an embodiment, the NAS processing unit is configured to: if the first network slice does not belong to the at least one supported network slice, and/or the first network slice belongs to the at least one allowed network slice, skip generating the session establishment request of the first service, or stop sending the session establishment request of the first service to the AS processing unit.

In an embodiment, the NAS processing unit is configured to: if the first network slice does not belong to the at least one supported network slice, and/or the first network slice belongs to the at least one allowed network slice, generate the session establishment request of the first service, where the session establishment request carries the third information, and send the session establishment request of the first service to the AS processing unit. The AS processing unit is configured to control the transceiver unit to send the session establishment request of the first service to a core network device (for example, through an access network device).

In an embodiment, the NAS processing unit sends information about the first network slice to the AS processing unit, where the first network slice includes the network slice corresponding to the first service. The NAS processing unit is configured to: if the first network slice belongs to the at least one allowed network slice, send the session establishment request of the first service to the AS processing unit. The AS processing unit is configured to: if the first network slice belongs to the at least one supported network slice, control the transceiver unit to send the session establishment request of the first service.

In an embodiment, the AS processing unit is configured to: if the first network slice belongs to the at least one supported network slice, control the transceiver unit to send the session establishment request of the first service to a core network device (for example, through an access network device).

In an embodiment, the AS processing unit is configured to: if the first network slice does not belong to the at least one supported network slice, control the transceiver unit to stop sending the session establishment request of the first service.

In an embodiment, the processing unit is configured to: if the first network slice does not belong to the at least one supported network slice, send feedback information to a NAS at an AS, and no longer generate, at the NAS, the session establishment request of the first service based on the feedback information, or stop sending, at the NAS, the session establishment request of the first service to the AS.

In an embodiment, the AS processing unit is configured to: if the first network slice does not belong to the at least one supported network slice, send feedback information to the NAS processing unit. The NAS processing unit is configured to: generate the session establishment request of the first service based on the feedback information, where the session establishment request carries the third information, and send the session establishment request of the first service to the AS processing unit. The AS processing unit is configured to control the transceiver unit to send the session establishment request of the first service to a core network device (for example, through an access network device).

In an embodiment, the NAS processing unit is configured to send information about the first network slice to the AS processing unit, where the first network slice includes the network slice corresponding to the first service.

In addition, the NAS processing unit is configured to: if the first network slice belongs to the at least one allowed network slice, send the session establishment request of the first service to the AS processing unit.

The AS processing unit is configured to: if the first network slice does not belong to the at least one supported network slice, send feedback information to the NAS processing unit, where the feedback information indicates that the first network slice does not belong to the at least one supported network slice.

In this case, the NAS processing unit is configured to: no longer generate the session establishment request of the first service based on the feedback information, or stop sending the session establishment request of the first service to the AS processing unit.

Alternatively, the NAS processing unit is configured to: generate the session establishment request of the first service based on the feedback information, where the session establishment request carries the third information, and send the session establishment request of the first service to the AS processing unit. In addition, the AS processing unit is configured to control the transceiver unit to send the session establishment request of the first service to a core network device (for example, through an access network device).

In an embodiment, the NAS processing unit is configured to send information about the first network slice to the AS processing unit, where the first network slice includes the network slice corresponding to the first service. The NAS processing unit is configured to send information about the at least one allowed network slice to the AS processing unit. The NAS processing unit is configured to send the session establishment request of the first service to the AS processing unit.

If the first network slice belongs to the at least one supported network slice, and the first network slice belongs to the at least one allowed network slice, the AS processing unit controls the transceiver unit to send the session establishment request of the first service.

If the first network slice does not belong to the at least one supported network slice, or the first network slice does not belong to the at least one allowed network slice, the AS processing unit sends feedback information to the NAS processing unit, where the feedback information indicates that the first network slice does not belong to the at least one supported network slice.

In this case, the NAS processing unit no longer generates the session establishment request of the first service based on the feedback information, or stops sending the session establishment request of the first service to the AS processing unit.

Alternatively, the NAS processing unit generates the session establishment request of the first service based on the feedback information, where the session establishment request carries the third information, and sends the session establishment request of the first service to the AS processing unit. The AS processing unit controls the transceiver unit to send the session establishment request of the first service to a core network device (for example, through an access network device).

The AS processing unit performs determining, to reduce processing load of the NAS processing unit.

Units in the apparatus are separately configured to perform the operations of the communication method according to any one of the first aspect and the implementations of the first aspect.

In a design, the apparatus is a communication chip, and the communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

It should be understood that the foregoing described solution in which the processing unit includes the NAS processing unit and the AS processing unit is merely an example for description. This application is not limited thereto. Alternatively, the same processing unit may perform actions performed by both the NAS processing unit and the AS processing unit.

According to a fifth aspect, a communication apparatus is provided. The communication apparatus includes: a transceiver unit, configured to communicate with a terminal device; and a processing unit, configured to: obtain indication information, where the indication information indicates at least one of the following: whether a first service corresponding to the terminal device supports network slice remapping, whether the first service supports network slice fallback, whether the terminal device supports cell redirection, information about at least one second cell, information about at least one second access device, and information about at least one second network slice; the second cell supports a first network slice; the second access device supports the first network slice; and the second network slice belongs to a supported network slice; and control, based on the indication information, the transceiver unit to communicate with the terminal device.

In an embodiment, a core network device obtains the indication information, so that when a cell or an access device that is currently accessed by the terminal device does not support the first network slice corresponding to the first service that the terminal requests to access, the core network device controls the terminal device based on the indication information, to reduce resource overheads.

In an embodiment, the transceiver unit is configured to receive the indication information from the terminal device.

In an embodiment, the terminal device may determine whether the currently accessed cell or access device supports the first network slice, and send the indication information when determining that the currently accessed cell or access device does not support the first network slice.

Alternatively, the terminal device may directly send the indication information to the core network device without performing determining.

In an embodiment, the indication information may be stored, as network slice subscription information of the terminal device, in a network device such as a unified data management (UDM) network element.

Therefore, the transceiver unit is configured to receive the indication information from the network device such as the UDM.

In an embodiment, the processing unit is further configured to: determine whether the currently accessed cell or access device supports the first network slice, and control the terminal device based on the indication information when determining that the currently accessed cell or access device does not support the first network slice.

In an embodiment, the core network device may use different processing manners based on specific content indicated by the indication information.

To be specific, the processing unit is configured to: determine, from a plurality of processing manners based on the indication information, a first processing manner that satisfies a case indicated by the indication information, and communicate with the terminal device based on the first processing manner.

The plurality of processing manners include at least two of the following processing manners.

Manner 1: Performing Network Slice Remapping on the First Service

In an embodiment, when the indication information indicates whether the first service supports (in other words, whether the first service supports or does not support) the network slice remapping, the processing unit may determine, based on the third indication information, whether to perform processing in a manner of remapping the first service to another network slice (for example, a third network slice).

In an embodiment, the third network slice belongs to an allowed network slice, and the third network slice belongs to a network slice supported by a first cell or a first access device.

Therefore, a delay of accessing the first service by the terminal device can be reduced, and resource overheads caused when the core network device queries whether the first service supports the network slice remapping can be avoided.

Manner 2: Performing Network Slice Fallback on the First Service

In an embodiment, when the indication information indicates whether the first service supports the network slice fallback, the processing unit may determine, based on the third indication information, whether to perform processing in a manner of remapping the first service to a network slice (for example, a fourth network slice) that needs to be fallen back to.

The fourth network slice may be a network slice that is preconfigured by the network device for the terminal device and that is used for network slice fallback processing. In other words, the fourth network slice may be a target network slice that is preconfigured by the network device for the terminal device and that needs to be fallen back to during the network slice fallback processing.

In an embodiment, the third network slice belongs to a network slice supported by a first cell or a first access device.

Therefore, a delay of accessing the first service by the terminal device can be reduced, and resource overheads caused when the core network device queries whether the first service supports the network slice fallback can be avoided.

Manner 3:
Performing Cell Redirection on the Terminal Device

In an embodiment, when the indication information indicates whether the terminal device supports the cell redirection, the processing unit may determine, based on the third indication information, whether to perform processing in a manner of redirecting the terminal device to another cell (for example, a third cell).

In an embodiment, the third cell supports the first network slice.

Therefore, a delay of accessing the first service by the terminal device can be reduced, and resource overheads caused when the core network device queries whether the terminal device supports the cell redirection can be avoided.

Manner 4: Redirecting the Terminal Device to the Second Cell

In an embodiment, when the indication information indicates the information about the at least one second cell, where the second cell supports the first network slice, the processing unit may redirect the terminal device to the second cell based on the third indication information.

Therefore, the terminal device can access the first service in the second cell by using the first network slice, to reduce a delay of accessing the first service by the terminal device.

Manner 5: Redirecting the Terminal Device to a Cell of the Second Access Device

In an embodiment, when the indication information indicates the information about the at least one second access device, where the second access device supports the first network slice, the processing unit may redirect the terminal device to the second access device based on the third indication information.

Therefore, the terminal device can access the first service through the second access device by using the first network slice, to reduce a delay of accessing the first service by the terminal device.

Manner 6: Remapping the First Service to the Second Network Slice

In an embodiment, when the indication information indicates the information about the at least one second network slice, where the second network slice belongs to the supported network slice, the processing unit may remap the first service to the second network slice based on the third indication information.

Therefore, the terminal device can access the first service through a first access device by using the second network slice, to reduce a delay of accessing the first service by the terminal device.

In an embodiment, the core network device determines the first processing manner based on the indication information and a priority of each of the plurality of processing manners.

In an embodiment, the indication information is carried in a session establishment request of the first service.

Units in the apparatus are separately configured to perform the operations of the communication method according to any one of the second aspect and the implementations of the second aspect.

In a design, the apparatus is a communication chip, and the communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a sixth aspect, a communication apparatus is provided. The communication apparatus includes: a processing unit, configured to generate indication information, where the indication information indicates at least one of the following: whether a first service corresponding to a terminal device supports network slice remapping, whether the first service supports network slice fallback, whether the terminal device supports cell redirection, information about at least one second cell, information about at least one second access device, and information about at least one second network slice; the second cell supports a first network slice; the second access device supports the first network slice; and the second network slice belongs to a supported network slice; and a transceiver unit, configured to send the indication information.

In an embodiment, the terminal device sends the indication information to a core network device, so that when a cell or an access device that is currently accessed by the terminal device does not support the first network slice corresponding to the first service that the terminal requests to access, the core network device controls the terminal device based on the indication information, to reduce resource overheads.

In an embodiment, the transceiver unit is further configured to receive first information, where the first information indicates at least one supported network slice, the at least one supported network slice includes a network slice supported by a first cell and/or a network slice supported by a first access device, the first cell includes the cell currently accessed by the terminal device, and the first access device includes the access device currently accessed by the terminal device.

The processing unit is configured to determine, based on the first information, that the first network slice does not belong to the supported network slice.

In an embodiment, the indication information is carried in a session establishment request of the first service.

Units in the apparatus are separately configured to perform the operations of the communication method according to any one of the third aspect and the implementations of the third aspect.

In a design, the apparatus is a communication chip, and the communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a seventh aspect, a communication device is provided. The communication device includes a processor. The processor is coupled to a memory, the memory is configured to store a computer program, and the processor is configured to invoke the computer program from the memory and run the computer program, to enable the communication device to perform the communication method according to any one of the first aspect to the third aspect and the implementations of the first aspect to the third aspect.

In an embodiment, there are one or more processors, and there are one or more memories.

In an embodiment, the memory may be integrated with the processor, or the memory and the processor are disposed separately.

In an embodiment, the communication device further includes a transmitter and a receiver.

According to an eighth aspect, a communication system is provided. The communication system includes a network device and a terminal device.

The terminal device is configured to perform the method according to the first aspect and the implementations of the first aspect, or the third aspect and the implementations of the third aspect. The network device (for example, a core network device) is configured to perform the method according to the second aspect and the implementations of the second aspect.

In an embodiment, the communication system may further include another device, for example, an access network device, that interacts with the network device or the terminal device in the solutions provided in embodiments of this application.

According to a ninth aspect, a computer program product is provided. The computer program product includes a computer program (which may also be referred to as code or instructions). When the computer program is run, a computer is enabled to perform the method according to any one of the first aspect to the third aspect and the possible implementations of the first aspect to the third aspect.

According to a tenth aspect, a computer-readable medium is provided. The computer-readable medium stores a computer program (which may also be referred to as code or instructions). When the computer program is run, a computer is enabled to perform the method according to any one of the first aspect to the third aspect and the possible implementations of the first aspect to the third aspect.

According to an eleventh aspect, a chip system is provided. The chip system includes a memory and a processor. The memory is configured to store a computer program, and the processor is configured to invoke the computer program from the memory and run the computer program, to enable a communication device on which the chip system is installed to perform the method according to any one of the first aspect to the third aspect and the possible implementations of the first aspect to the third aspect.

The chip system may include an input circuit or interface configured to send information or data, and an output circuit or interface configured to receive information or data.

BRIEF DESCRIPTION OF DRAWINGS

FIG. 3A to FIG. 3C are a schematic interaction diagram of an example of a process of initiating a session establishment request according to this application;

DESCRIPTION OF EMBODIMENTS

The following describes technical solutions in this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a 5th generation (5G) system, a 6th generation (6G) system in the future, or a new radio (NR) system.

Figure 1:
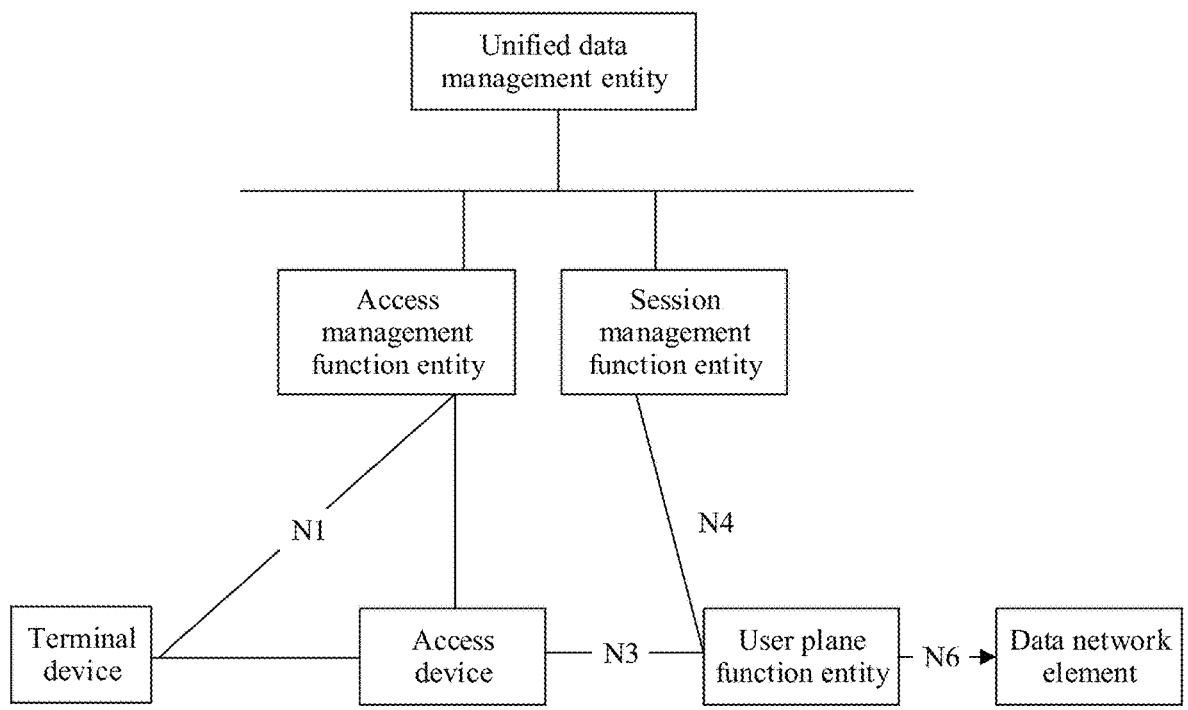
FIG. 1 is a diagram of an architecture of a communication system to which an embodiment of this application is applicable.

The following describes a structure of a communication system in this application with reference to FIG. 1.

As shown in FIG. 1, the communication system includes but is not limited to the following network elements.

1. Terminal Device

The terminal device in embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, some examples of the terminal are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless telephone set, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like. This is not limited in embodiments of this application.

By way of example and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that is directly worn on a body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs. In addition, in embodiments of this application, the terminal device may alternatively be a terminal device in an internet of things (IoT) system.

In addition, in embodiments of this application, the terminal device may further communicate with a terminal device in another communication system, for example, the terminal device performs inter-device communication. For example, the terminal device may further transmit (for example, send and/or receive) a time synchronization packet with the terminal device in the another communication system.

2. Access Device

In addition, the access device in embodiments of this application may be a device configured to communicate with a terminal device, and the access device may also be referred to as an access network device or a radio access network device. For example, the access device may be an evolved NodeB (eNB or eNodeB) in an LTE system; may be a radio controller in a cloud radio access network (CRAN) scenario; may be a relay station, an access point, a vehicle-mounted device, a wearable device, an access device in a 5G network, or an access device in a future evolved PLMN network; may be an access point (AP) in a WLAN; or may be a gNB in an NR system. This is not limited in embodiments of this application.

In addition, in embodiments of this application, the access device is a device in a RAN, in other words, the access device is a RAN node that enables the terminal device to access a wireless network. For example, by way of example and not limitation, the access device may be a gNB, a transmission reception point (TRP), an evolved NodeB (eNB), a radio network controller (RNC), a NodeB (NB), a base station controller (BSC), a base transceiver station (BTS), a home evolved NodeB (or a home NodeB, HNB), a baseband unit (BBU), or a wireless fidelity (Wi-Fi) access point (AP). In a network structure, a network device may include a central unit (CU) node, a distributed unit (DU) node, a RAN device including a CU node and a DU node, or a RAN device including a control plane CU node (CU-CP node), a user plane CU node (CU-UP node), and a DU node.

The access device may serve a cell. The terminal device communicates with the access device on a transmission resource (for example, a frequency domain resource, or in other words, a frequency spectrum resource) used for the cell. The cell may be a cell corresponding to the access device (for example, a base station). The cell may belong to a macro base station, or a base station corresponding to a small cell. The small cell herein may include a metro cell, a micro cell, a pico cell, a femto cell, or the like. These small cells have features of small coverage and low transmit power, and are applicable to providing a high-speed data transmission service.

In addition, a plurality of cells may simultaneously work in a same frequency band on a carrier in the LTE system or the 5G system. In some special scenarios, it may be considered that a concept of the carrier is equivalent to that of the cell. For example, in a carrier aggregation (CA) scenario, both a carrier index of a secondary component carrier and a cell identifier (ID) of a secondary cell that works on the secondary component carrier are carried when the secondary component carrier is configured for UE. In this case, it may be considered that the concept of the carrier is equivalent to that of the cell. For example, that the terminal device accesses a carrier is equivalent to that the terminal device accesses a cell.

The communication system in this application may be further applicable to a vehicle to everything (V2X) technology. To be specific, the terminal device in this application may alternatively be a vehicle, for example, an intelligent vehicle or an autonomous vehicle.

Herein, "X" in V2X represents different communication targets, and the V2X may include but is not limited to vehicle to vehicle (V2V), vehicle to infrastructure (V2I), vehicle to network (V2N), and vehicle to pedestrian (V2P).

In the V2X, the access device may configure a "zone" for the UE. The zone may also be referred to as a geographical area. After the zone configuration, the world is divided into a plurality of zones, and the zones are defined by reference points, lengths, and widths. When determining a zone ID, the UE uses a zone length, a zone width, a quantity of zones above the length, a quantity of zones above the width, and a zone reference point to perform a remainder operation. The foregoing information may be configured by the access device.

3. Access Management Function Entity

The access management function entity is mainly configured to perform mobility management, access management, and the like, and may be configured to implement a function other than session management in functions of a mobility management entity (MME) in an LTE system, for example, functions such as lawful interception and access authorization/authentication.

In a 5G communication system, the access management network element may be an access management function (AMF) entity.

In a future communication system, the access management function entity may still be an AMF entity, or may have another name. This is not limited in this application.

4. Session Management Function Entity

The session management function (SMF) entity is mainly configured to perform session management, internet protocol (IP) address allocation and management of a terminal device, selection of an endpoint that can manage a user plane function and a policy control and charging function interface, downlink data notification, and the like.

In the future communication system, the session management network element may still be an SMF entity, or may have another name. This is not limited in this application.

5. Unified Data Management Entity

The unified data management (UDM) entity is responsible for unified processing of frontend data, including a subscriber identifier, user subscription data, authentication data, and the like.

It should be noted that the foregoing "entity" may also be referred to as a network element, a device, an apparatus, a module, or the like. This is not particularly limited in this application. In addition, in this application, for ease of understanding and description, the descriptions of the "entity" are omitted in some descriptions. For example, the SMF entity is referred to as an SMF for short. In this case, the "SMF" should be understood as an SMF network element or an SMF entity. Descriptions of same or similar cases are omitted below.

It may be understood that the entities or the functions may be network elements in a hardware device, may be software functions running on dedicated hardware, or may be virtualized functions instantiated on a platform (for example, a cloud platform).

It should be understood that the foregoing network elements or entities included in the communication system described above are merely examples for descriptions, and this is not particularly limited in this application. For example, the communication system may further include but is not limited to an application function (AF) entity, a network exposure function (NEF) entity, a user plane function (UPF) entity, a data network (DN), a policy control function (PCF) entity, and the like.

Figure 2:
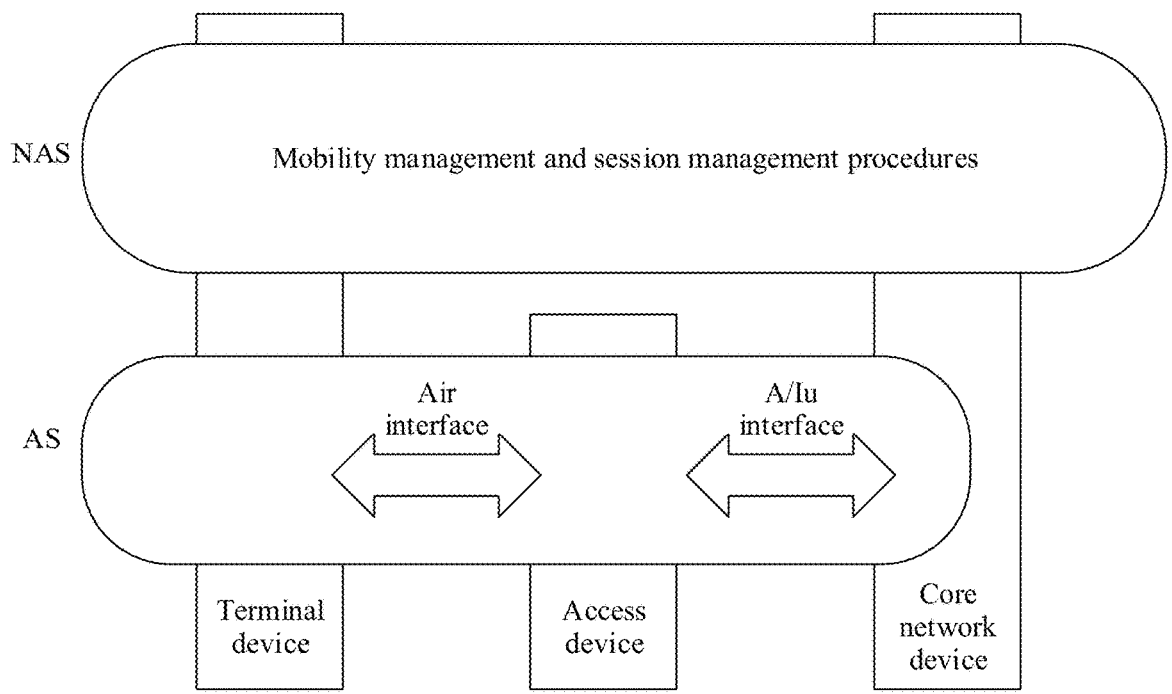
FIG. 2 is a schematic diagram of a communication protocol layer to which an embodiment of this application is applicable.

FIG. 2 is a schematic diagram of an architecture of a protocol layer of a communication system according to this application. As shown in FIG. 2, the protocol layer of a terminal device may include an access stratum (AS) and a non-access stratum (NAS).

The access stratum and the non-access stratum are actually defined from a perspective of a protocol stack.

In the protocol stack, an upper-layer protocol module irrelevant to wireless access is generally referred to as a NAS. As shown in FIG. 2, the NAS exists between the UE and a core network (CN), and mainly implements service-related functions. The non-access stratum refers to a signaling layer at which only the UE and the CN need to perform processing, and a radio access network, for example, an RNC and a NodeB, only performs transparent transmission and does not need to perform processing.

A procedure of the non-access stratum mainly includes mobility management in a circuit domain, call control in the circuit domain, mobility management in a packet domain, session management in the packet domain, and the like.

By way of example and not limitation, the NAS is mainly used for user identity registration and authentication management, mobility management, call service management, call parameter setting, and the like.

In the protocol stack, a radio resource control (RRC) layer, a radio access network application protocol (RANAP) layer, and another protocol layer below are referred to as an access stratum. In other words, the AS refers to a signaling layer at which a device at a wireless access layer, for example, an RNC or a NodeB, needs to participate in processing. As shown in FIG. 2, all communication protocols of the access stratum are related to wireless access, and the AS exists between the UE and the RNC.

A procedure of the access stratum mainly includes PLMN selection, cell selection, radio resource management, and the like.

By way of example and not limitation, the AS is mainly used for radio resource management, quality of service (QoS) control, radio channel transmission format setting, service data segmentation and assembly, security processing, and the like.

From the perspective of the protocol stack, procedures of the access stratum are some lower-layer procedures, through which lower-layer bearers are established for upper-layer signaling procedures.

The procedure of the non-access stratum mainly includes the mobility management in the circuit domain, the call control in the circuit domain, the mobility management in the packet domain, and the session management in the packet domain.

A NAS protocol processes transmission of information between the UE and the CN. Transmitted content may be user information or control information, for example, service creation and release or mobility management information. A NAS message is independent of an AS protocol structure to some extent, in other words, irrelevant to a type of a used radio access network.

The NAS message is transmitted based on a lower-layer AS protocol. The AS protocol is a protocol used by the radio access network. The AS protocol in a UMTS includes a radio interface protocol, an Iub protocol, and an Iu protocol. The radio interface protocol is a protocol between the UE and a UTRAN, and an upper-layer (for example, MAC, RLC, and RRC) protocol is located between the UE and the RNC. A lower-layer (for example, PHY) protocol is located between the UE and the NodeB.

A "core network device" in this application may include any device, for example, the access management function entity or the session management function entity, that can communicate with the terminal device through transparent transmission performed by one or more intermediate devices (for example, access devices). In other words, the "core network device" in this application may be a device that communicates with the terminal device by using NAS signaling.

For ease of understanding and description, the following describes a processing process of this application in detail by using an example in which the AMF is used as the core network device.

The following describes some terms in this application.

1. Supported Network Slice

In this application, the "supported network slice" may be understood as a network slice supported by a cell or a network slice supported by an access device.

The network slice supported by the cell may be understood as that a configuration (for example, a resource configuration) of the cell can satisfy a requirement of the network slice, or a service corresponding to the network slice can be transmitted in the cell, or accuracy and reliability of transmitting a service corresponding to the network slice in the cell can satisfy a requirement of the service.

Similarly, the network slice supported by the access device may be understood as that a configuration (for example, a resource configuration) of the access device can satisfy a requirement of the network slice, or a service corresponding to the network slice can be transmitted through the access device, or accuracy and reliability of transmitting a service corresponding to the network slice through the access device can satisfy a requirement of the service.

In an embodiment, the supported network slice may be sent by the access device to the terminal device in a broadcast or multicast mode.

In another embodiment, the supported network slice may be sent by the access device to the terminal device by using dedicated signaling (or in a unicast mode).

2. Allowed Network Slice

The "allowed network slice" may be understood as a network slice that is allowed to be used by the terminal device in a network in which the terminal device is currently located.

For example, when the terminal device is in a home network, the allowed network slice may be a network slice that is allocated by the home network to the terminal device and that is allowed to be used by the terminal device in the home network (for example, a registration area specified in the home network), and is denoted as an allowed network slice of the home network.

The allowed network slice of the home network is delivered by a network device (for example, a core network device) of the home network to the terminal device. Alternatively, the allowed network slice of the home network may be configured for the terminal device during registration or subscription of the terminal device.

For example, when the terminal device is in a visited network (or a visited network), the allowed network slice may be a network slice that is allocated by the visited network to the terminal device and that is allowed to be used by the terminal device in the visited network, and is denoted as an allowed network slice of the visited network.

In an embodiment, the allowed network slice of the visited network is delivered by a network device (for example, a core network device) of the visited network to the terminal device.

In another embodiment, there is a mapping relationship between the allowed network slice of the visited network and an allowed network slice of a home network, and the mapping relationship is delivered by a network device (for example, a core network device) of the visited network to the terminal device.

In addition, by way of example and not limitation, the network may include but is not limited to a PLMN, in other words, the home network may include but is not limited to a home public land mobile network (HPLMN). The visited network may include but is not limited to a visited public land mobile network (VPLMN).

3. Network Slice Remapping

Network slice remapping may mean that a service that has been mapped to a network slice is remapped to another network slice. For example, "remapping a network slice #1 to a network slice #2" may be understood as that a service of the slice #1 (or a service mapped to the slice #1) may be implemented by using the slice #2, or a service of the slice #1 is implemented by using a network resource of the slice #2.

That a service "supports slice remapping" may be understood as that a service that has been mapped to a network slice is allowed to be remapped to another network slice, in other words, the service is allowed to be (or can be) implemented by using a network slice other than the network slice that has been mapped to.

That a service "does not support slice remapping" may be understood as that a service that has been mapped to a network slice is not allowed to be remapped to another network slice, in other words, the service is allowed to be (or can be) implemented only by using the network slice that has been mapped to.

4. Network Slice Fallback

The network slice fallback may mean that a service that has been mapped to a network slice is remapped to a pre-allocated specified network slice (referred to as an initial network slice for ease of understanding), where the initial network slice may be pre-allocated by a network to the terminal device.

That a service "supports network slice fallback" may be understood as that a service that has been mapped to a network slice is allowed to be mapped to an initial network slice, in other words, the service is allowed to be (or can be) implemented by using the initial network slice.

That a service "does not support slice fallback" may be understood as that a service that has been mapped to a network slice is not allowed to be mapped to an initial network slice, in other words, the service is allowed to be implemented only by using the network slice that has been mapped to.

5. Cell Redirection

To support mobility of the terminal device, technologies such as handover and redirection may be provided.

In an embodiment, the handover is performed through a handover procedure, including handover determining: determining performed based on coverage, capacity, a service, or the like; and handover preparation: resource application, data forwarding, and the like that are performed between a source cell and a target cell. After the handover preparation is completed, a handover command is delivered, and UE performs handover.

The redirection does not include the handover preparation. A radio resource release (RRC release) message carries target cell information, and the UE re-initiates access based on the target cell information.

The redirection is a transitional method for UE that does not support the handover.

FIG. 3A to FIG. 3C show a processing process performed when a terminal device #A (namely, an example of a terminal device) needs to access a service #A (namely, an example of a first service) in a currently accessed cell #A (namely, an example of a first cell) and through a currently accessed access device #A (namely, an example of a first access device).

In some embodiments of this application, a service may also be referred to as an application.

It should be noted that the access device #A may provide one cell, namely, the cell #A.

Alternatively, the access device #A may provide a plurality of cells including the cell #A. The plurality of cells may support a same network slice or different network slices. This is not particularly limited in this application.

It should be noted that the terminal device #A may be currently in a home network or a visited network. This is not particularly limited in this application.

As shown in FIG. 3A to FIG. 3C, in S110, the terminal device #A may receive information #A (namely, an example of first information) indicating a network slice supported by the cell #A.

The network slice supported by the cell #A includes at least one network slice.

In other words, the information #A indicates at least one network slice supported by the cell #A.

For example, the information #A includes information about the at least one network slice supported by the cell #A.

By way of example and not limitation, information about a network slice may also be referred to as an identifier of the network slice, and information about one network slice indicates the network slice.

By way of example and not limitation, information about a network slice may include but is not limited to single network slice selection assistance information (S-NSSAI).

In this case, the information #A may include at least one piece of supported network slice selection assistance information (NSSAI). The at least one piece of supported NSSAI may be understood as NSSAI of the network slice supported by the cell #A.

In addition, the network slice indicated by the information #A may be all or a part of network slices supported by the cell #A. This is not particularly limited in this application.

By way of example and not limitation, the information #A may be sent by the access device #A to the terminal device #A in a broadcast mode, a multicast mode, a unicast mode, or the like.

In other words, the information #A is information encapsulated at an AS protocol layer, and the terminal device #A may receive the information #A at the AS.

It should be understood that the described process in which the terminal device #A obtains the information #A is merely an example for description, and this application is not limited thereto. For example, the information #A may alternatively be obtained by the terminal device #A from another terminal device in a mode such as a D2D transmission mode.

In S120, the terminal device #A may receive information #B (namely, an example of second information) indicating an allowed network slice.

The allowed network slice of the terminal device #A includes at least one network slice.

In other words, the information #B indicates at least one allowed network slice of the terminal device #A in a current network (the home network or the visited network).

In other words, the information #B includes information about the at least one allowed network slice of the terminal device #A.

For example, the information #B may include at least one piece of allowed network slice selection assistance information (NSSAI). The allowed NSSAI may be understood as NSSAI of the allowed network slice of the terminal device #A in the current network.

In addition, the network slice indicated by the information #B may be all or a part of allowed network slices of the terminal device #A. This is not particularly limited in this application.

By way of example and not limitation, the information #B may be sent to the terminal device #A by a network device (for example, a core network device, denoted as a core network device #A) in the network in which the terminal device #A is currently located.

In other words, the information #B is information encapsulated at a NAS protocol layer, and the terminal device #A may receive the information #B at the NAS.

The core network device #A may include various devices such as an MME, an AMF, or an SMF that can communicate with the terminal device by using NAS signaling. This is not particularly limited in this application.

In addition, the terminal device #A may determine information about a network slice (denoted as a network slice #1) corresponding to the service #A (or an application #A). By way of example and not limitation, the terminal device #A may perform the action at the NAS.

The network slice #1 includes a network slice to which the service #A is mapped.

When the terminal device #A is in the home network, the network slice #1 may be a network slice of the home network.

When the terminal device #A is in the visited network, the network slice #1 may be a network slice corresponding to a network slice #2, and the network slice may be a network slice corresponding to the service #A in the home network.

In addition, the information about the network slice #1 may include S-NSSAI of the network slice #1, which is denoted as S-NSSAI #1.

Then, the terminal device #A processes a session (denoted as a session #A) of the service #A based on the network slice #1, the network slice supported by the cell #A, and the allowed network slice of the terminal device #A. Specifically, the processing is performed on a request for establishing the session #A.

In an embodiment, the terminal device #A performs processing based on a relationship between the S-NSSAI #1, the supported NSSAI, and the allowed NSSAI.

A determining process may be performed at the NAS (that is, manner A), may be performed at the AS (that is, manner B), or may be jointly performed at the AS and the NAS (that is, manner C). The following describes the process in detail.

Manner A

In S131, the AS (for example, a logical processing unit of the AS) of the terminal device #A may send, to the NAS (for example, a logical processing unit of the NAS), information about a network slice set #A (for example, information about each network slice in the network slice set #A), for example, the supported NSSAI.

In S132, the NAS of the terminal device #A determines whether the network slice #1 belongs to the network slice supported by the cell #A, for example, whether the S-NSSAI #1 belongs to the supported NSSAI.

The NAS of the terminal device #A determines whether the network slice #1 belongs to the allowed network slice of the terminal device #A, for example, whether the S-NSSAI #1 belongs to the allowed NSSAI.

The NAS of the terminal device #A processes, based on determining results, the request for establishing the session #A.

The determining results may include: the S-NSSAI #1 belongs to the supported NSSAI, and the S-NSSAI #1 belongs to the allowed NSSAI (namely, a determining result #1); and the S-NSSAI #1 does not belong to the supported NSSAI, and/or the S-NSSAI #1 does not belong to the allowed NSSAI (namely, a determining result #2).

The following separately describes in detail processing performed based on the determining results.

Determining Result #1

The NAS of the terminal device #A may generate the request for establishing the session #A, and send, to the AS of the terminal device #A, the request for establishing the session #A.

The AS of the terminal device #A may send, to the core network device #A through the access device #A, the request for establishing the session #A. The request for establishing the session #A includes the information about the network slice #1, for example, the S-NSSAI #1.

Determining Result #2

In the case of the determining result #2, processing manners may include but are not limited to the following manners.

Manner 2a

If the request for establishing the session #A is not generated, the NAS of the terminal device #A does not generate (for example, is prohibited from generating) the request for establishing the session #A.

If the request for establishing the session #A has been generated, the NAS of the terminal device #A stops (for example, is prohibited from) sending, to the AS of the terminal device #A, the request for establishing the session #A.

Manner 2b

In S133, the NAS of the terminal device #A may generate the request for establishing the session #A, where the request for establishing the session #A includes the information about the network slice #1, for example, the S-NSSAI #1, and the request for establishing the session #A includes information #C (namely, an example of third information).

The information #C may include but is not limited to at least one of the following information.

Information #C1

In an embodiment, the information #C1 indicates whether the service #A supports network slice remapping. In other words, the information #C1 indicates that the service #A supports the network slice remapping, or the information #C1 indicates that the service #A does not support the network slice remapping.

For example, in this application, the network device (for example, the core network device) may deliver, to the terminal device in advance, information indicating whether one or more of a plurality of services support network slice remapping, so that the terminal device may determine, based on the information, whether a service supports the network slice remapping.

For another example, in this application, the network device (for example, the core network device) may deliver, to the terminal device in advance, a relationship between one or more service parameter groups (where each service parameter group may include at least one service parameter) and a case indicating whether network slice remapping is supported, so that the terminal device may determine, based on the relationship and a case corresponding to a service parameter group to which a service parameter of a service belongs, whether the service supports the network slice remapping.

By way of example and not limitation, the service parameter may include but is not limited to: urgency of the service, a priority of the service, a type of the service (for example, a real-time communication type or a download type), and the like.

In this case, the core network device #A can obtain the information #C1 from the request for establishing the session #A.

In addition, the core network device #A may obtain the determining result #2 in one or more of the following manners.

Manner x

For example, when detecting the information #C, the core network device #A may determine that the cell or the access device that is currently accessed by the terminal device #A does not support the network slice #1, or the allowed network slice of the terminal device #A does not include the network slice #1, to obtain the determining result #2.

Manner y

For another example, the request for establishing the session #A may further carry information #D. The information #D may indicate that the cell or the access device that is currently accessed by the terminal device #A does not support the network slice #1, or the allowed network slice of the terminal device #A does not include the network slice #1, to obtain the determining result #2.

Manner z

For another example, the core network device #A may determine information about the network slice supported by the cell #A, for example, the supported NSSAI. The core network device #A may determine information about the allowed network slice of the terminal device #A, for example, the allowed NSSAI. Therefore, the core network device #A may obtain the determining result #2 based on the foregoing information.

Then, the core network device #A may perform network slice remapping on the service #A based on the information #C1, that is, a processing manner 1.

For example, the core network device #A may remap the service #A to the network slice #2. The network slice #2 belongs to the network slice supported by the cell #A, and the network slice #2 belongs to the allowed network slice of the terminal device #A. In other words, information (denoted as S-NSSAI #2) about the network slice #2 belongs to the supported NSSAI, and the S-NSSAI #2 belongs to the allowed NSSAI.

Therefore, the terminal device #A can complete access to the service #A in the cell #A by using the network slice #2, or establish a session connection of the service #A by using the network slice #2.

Information #C2

In an embodiment, the information #C2 indicates whether the service #A supports network slice fallback. In other words, the information #C2 indicates that the service #A supports the network slice fallback, or the information #C1 indicates that the service #A does not support the network slice fallback.

For example, in this application, the network device (for example, the core network device) may deliver, to the terminal device in advance, information indicating whether each of a plurality of services supports network slice fallback, so that the terminal device may determine, based on the information, whether a service supports the network slice fallback.

For another example, in this application, the network device (for example, the core network device) may deliver, to the terminal device in advance, a relationship between a plurality of service parameter groups (where each service parameter group may include at least one service parameter) and a case indicating whether network slice fallback is supported, so that the terminal device may determine, based on the relationship and a case corresponding to a service parameter group to which a service parameter of a service belongs, whether the service supports the network slice fallback.

By way of example and not limitation, the service parameter may include but is not limited to: urgency of the service, a priority of the service, a type of the service (for example, a real-time communication type or a download type), and the like.

In this case, the core network device #A can obtain the information #C2 from the request for establishing the session #A.

In addition, the core network device #A may obtain the determining result #2 in one or more of the foregoing manners x to z.

Then, the core network device #A may perform network slice fallback on the service #A based on the information #C2, that is, a processing manner 2.

For example, the core network device #A may map the service #A to a network slice #3 (namely, an example of an initial network slice).

The network slice #3 may be a network slice that is pre-allocated by the network device (for example, the core network device) to the terminal device #A and that is used for network slice fallback processing.

In addition, the network slice #3 may belong to the network slice supported by the cell #A, or may not belong to the network slice supported by the cell #A. In addition, the network slice #3 may belong to the allowed network slice of the terminal device #A, or may not belong to the allowed network slice of the terminal device #A. This is not particularly limited in this application.

Information #C3

In an embodiment, the information #C3 indicates whether the terminal device #A supports cell redirection. In other words, the information #C3 indicates that the terminal device #A supports the cell redirection, or the information #C3 indicates that the terminal device #A does not support the cell redirection.

For example, in this application, the terminal device may determine, based on a capability of the terminal device, whether the cell redirection is supported.

In this case, the core network device #A can obtain the information #C3 from the request for establishing the session #A.

In addition, the core network device #A may obtain the determining result #2 in one or more of the foregoing manners x to z.

Then, the core network device #A may perform cell redirection on the terminal device #A based on the information #C3, that is, a processing manner 3.

For example, the core network device #A may redirect the terminal device #A to a cell #B (namely, an example of a second cell).

The network slice #1 may belong to a network slice supported by the cell #B.

Therefore, the terminal device #A can complete access to the service #A in the cell #B by using the network slice #1, or establish the session connection of the service #A in the cell #B.

Information #C4

In an embodiment, the information #C4 indicates a network slice #4 (namely, an example of a second network slice).

The network slice #4 may be determined by the terminal device #A based on the information #A and the information #B. In other words, the network slice #4 belongs to the network slice supported by the cell #A, and the network slice #4 belongs to the allowed network slice of the terminal device #A. In other words, information (denoted as S-NSSAI #4) about the network slice #4 belongs to the supported NSSAI, and the S-NSSAI #4 belongs to the allowed NSSAI.

In this case, the core network device #A can obtain the information #C4 from the request for establishing the session #A.

In addition, the core network device #A may obtain the determining result #2 in one or more of the foregoing manners x to z.

Then, the core network device #A may remap the service #A to the network slice #4 based on the information #C4, that is, a processing manner 4.

Therefore, the terminal device #A can complete access to the service #A in the cell #A by using the network slice #4, or establish the session connection of the service #A by using the network slice #4.

Information #C5

In an embodiment, the information #C5 indicates the cell #B (namely, the example of the second cell), where the cell #B is a cell that supports the network slice #1.

For example, the cell #B may broadcast information about the network slice supported by the cell #B, so that the terminal device #A may determine, based on the information broadcast by the cell #B (specifically, a network device of the cell #B), that the cell #B supports the network slice #1.

Alternatively, the terminal device #A may obtain, from another device (for example, another terminal device), information about the network slice supported by the cell #B. This is not particularly limited in this application.

In this case, the core network device #A can obtain the information #C5 from the request for establishing the session #A.

In addition, the core network device #A may obtain the determining result #2 in one or more of the foregoing manners x to z.

Then, the core network device #A may perform cell redirection on the terminal device #A based on the information #C5, so that the terminal device #A performs communication in the cell #B, that is, a processing manner 5.

Therefore, the terminal device #A can complete access to the service #A in the cell #B by using the network slice #1, or establish the session connection of the service #A in the cell #B.

In an embodiment, when the information #C includes two or more of the foregoing C1 to C5, the processing performed by the core network device based on the information #C may include two or more of the foregoing processing manners 1 to 5.

In this case, priorities of the processing manners 1 to 5 may be set by an administrator or specified in a communication protocol, and a processing manner with a higher priority (for example, a highest priority) is selected from optional processing manners based on a case indicated by specific information actually included in the information #C, to control the terminal device #A.

In addition, the priorities of the processing manners 1 to 5 may be randomly set according to requirements. This is not particularly limited in this application.

Manner B

In S134, the NAS (for example, a logical processing unit of the NAS) of the terminal device #A may determine whether the network slice #1 belongs to the allowed network slice of the terminal device #A, for example, whether the S-NSSAI #1 belongs to the allowed NSSAI.

If a determining result is that the network slice #1 belongs to the allowed network slice of the terminal device #A, the NAS of the terminal device #A sends a session establishment request of the service #A to the AS (for example, a logical processing unit of the AS). The request for establishing the session #A includes the information about the network slice #1, for example, the S-NSSAI #1.

It should be noted that the request for establishing the session #A may not include the information about the network slice #1. In other words, the NAS of the terminal device #A may separately send, to the AS, the information about the network slice #1 and the request for establishing the session #A.

In S135, the AS of the terminal device #A may determine whether the network slice #1 belongs to the network slice supported by the cell #A, for example, whether the S-NSSAI #1 belongs to the supported NSSAI.

If a determining result is that the network slice #1 belongs to the network slice supported by the cell #A, the AS may send, to the core network device #A through the access device #A, the request for establishing the session #A.

If a determining result is that the network slice #1 does not belong to the network slice supported by the cell #A, the AS sends feedback information to the NAS and stops sending, to the access device #A, the request for establishing the session #A, where the feedback information indicates that the network slice #1 does not belong to the network slice supported by the cell #A.

In S136, the NAS of the terminal device #A may process, based on the feedback information, the request for establishing the session #A.

For example, the NAS of the terminal device #A does not generate (for example, is prohibited from generating) the request for establishing the session #A.

For another example, the NAS of the terminal device #A may generate the request for establishing the session #A, where the request for establishing the session #A includes the information about the network slice #1, for example, the S-NSSAI #1, and the request for establishing the session #A includes information #C (namely, an example of third information).

Information included in the information #C and processing performed by the core network device based on the information #C may be similar to those in the process described in manner A. To avoid repetition, detailed descriptions are omitted herein.

Manner C

In S137, the NAS of the terminal device #A sends a session establishment request of the service #A to the AS (for example, a logical processing unit of the AS), where the request for establishing the session #A includes the information about the network slice #1, for example, the S-NSSAI #1.

It should be noted that the request for establishing the session #A may not include the information about the network slice #1. In other words, the NAS of the terminal device #A may separately send, to the AS, the information about the network slice #1 and the request for establishing the session #A.

In addition, the NAS of the terminal device #A sends, to the AS, information about the allowed network slice of the terminal device #A, for example, the allowed NSSAI.

In S138, the AS of the terminal device #A determines whether the network slice #1 belongs to the network slice supported by the cell #A, for example, whether the S-NSSAI #1 belongs to the supported NSSAI.

The AS of the terminal device #A determines whether the network slice #1 belongs to the allowed network slice of the terminal device #A, for example, whether the S-NSSAI #1 belongs to the allowed NSSAI.

If a determining result is that the network slice #1 belongs to the network slice supported by the cell #A, and the network slice #1 belongs to the allowed network slice of the terminal device #A, the AS may send, to the core network device #A through the access device #A, the request for establishing the session #A.

If a determining result is that the network slice #1 does not belong to the network slice supported by the cell #A, and/or the network slice #1 does not belong to the allowed network slice of the terminal device #A, the AS sends feedback information to the NAS and stops sending, to the access device #A, the request for establishing the session #A, where the feedback information indicates that the network slice #1 does not belong to the network slice supported by the cell #A and/or a network slice #2 does not belong to the network slice supported by the cell #A.

In S139, the NAS of the terminal device #A may process, based on the feedback information, the request for establishing the session #A.

For example, the NAS of the terminal device #A does not generate (for example, is prohibited from generating) the request for establishing the session #A.

For another example, the NAS of the terminal device #A may generate the request for establishing the session #A, where the request for establishing the session #A includes the information about the network slice #1, for example, the S-NSSAI #1, and the request for establishing the session #A includes information #C (namely, an example of third information).

Information included in the information #C and processing performed by the core network device based on the information #C may be similar to those in the process described in manner A. To avoid repetition, detailed descriptions are omitted herein.

Figure 4:
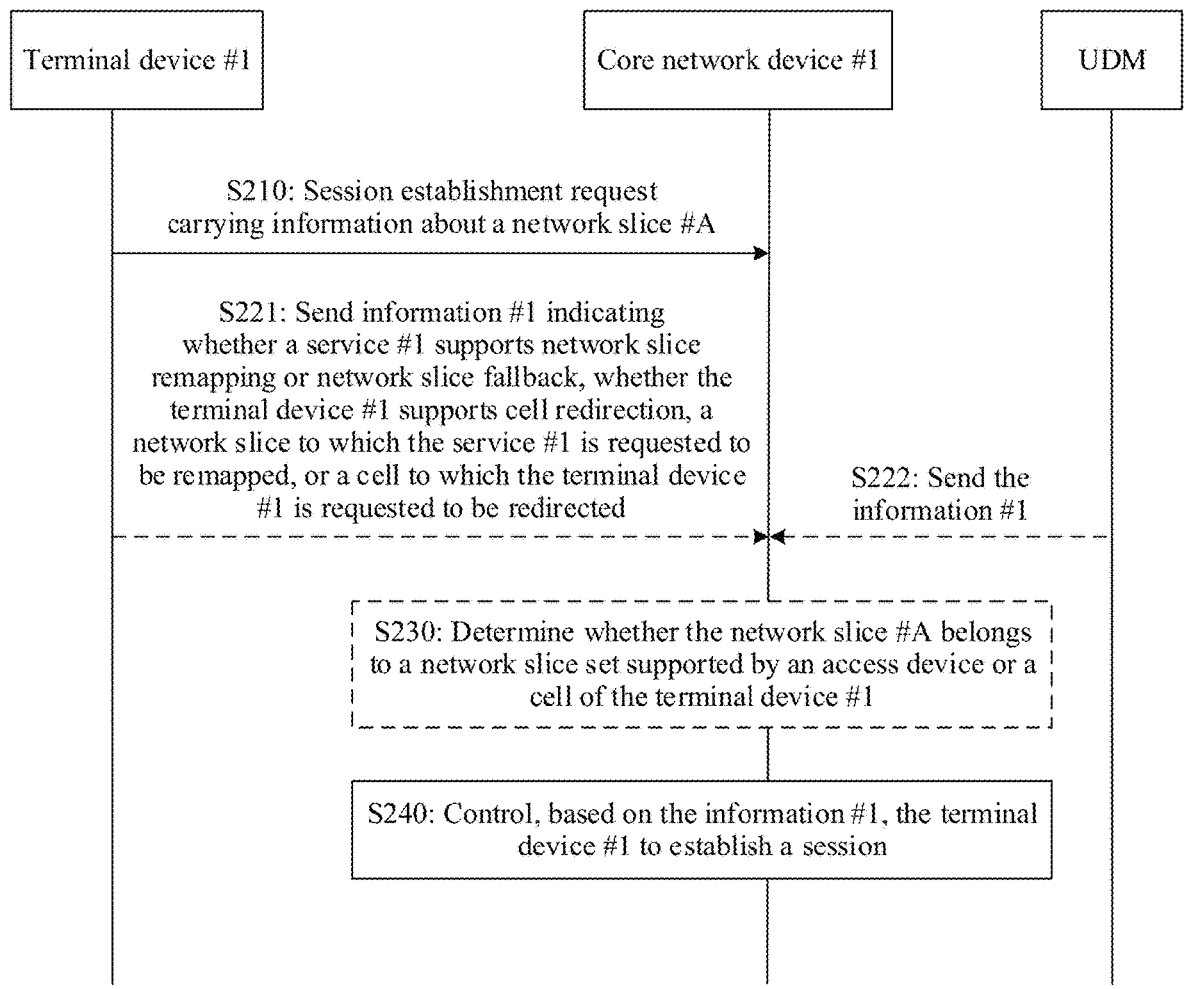
FIG. 4 is a schematic interaction diagram of another example of a process of initiating a session establishment request according to this application.

FIG. 4 shows a processing process performed when a core network device #1 receives a session establishment request from a terminal device #1. For ease of understanding and description, an access device currently accessed by the terminal device #1 is denoted as an access device #1 (namely, an example of a first access device), a cell currently accessed by the terminal device #1 is denoted as a cell #1 (namely, an example of a first cell), and a service that the terminal device currently needs to access is denoted as a service #1 (namely, an example of a first service). A network slice (namely, an example of a first network slice) corresponding to the service #1 is denoted as a network slice #A.

It should be noted that the access device #1 may provide one cell, namely, the cell #1.

Alternatively, the access device #1 may provide a plurality of cells including the cell #1. The plurality of cells may support a same network slice or different network slices. This is not particularly limited in this application.

It should be noted that the terminal device #1 may be currently in a home network or a visited network. This is not particularly limited in this application.

As shown in FIG. 4, in S210, the terminal device #1 sends the session establishment request of the service #1 to the core network device #1, where the session establishment request carries information about the network slice #A corresponding to the service #1, for example, S-NSSAI of the network slice #A, which is denoted as S-NSSAI #A.

In addition, the core network device #1 obtains information #1 (namely, an example of indication information).

The information #1 may include but is not limited to at least one of the following information.

Information #1A

In an embodiment, the information #1A indicates whether the service #1 supports network slice remapping. In other words, the information #1A indicates that the service #1 supports the network slice remapping, or the information #1A indicates that the service #1 does not support the network slice remapping.

Information #1B

In an embodiment, the information #1B indicates whether the service #1 supports network slice fallback. In other words, the information #1B indicates that the service #1 supports the network slice fallback, or the information #1B indicates that the service #1 does not support the network slice fallback.

Information #1C

In an embodiment, the information #1C indicates whether the terminal device #1 supports cell redirection. In other words, the information #1C indicates that the terminal device #1 supports the cell redirection, or the information #1C indicates that the terminal device #1 does not support the cell redirection.

Information #1D

In an embodiment, the information #1D indicates a network slice #B (namely, an example of a second network slice).

The network slice #B belongs to a network slice set #1, and the network slice #B belongs to a network slice set #2.

Information #1E

In an embodiment, the information #1E indicates a cell #2 (namely, an example of a second cell), where the cell #2 is a cell that supports the network slice #A.

In an embodiment, in S221, the terminal device #1 may send the information #1 to the core network device #1. For example, the information #1 may be carried in the session establishment request of the service #1.

In addition, in this case, a determining method of the terminal device #1 and a process may be similar to a method for determining the information #C and a process that are in the method shown in FIG. 3A to FIG. 3C. To avoid repetition, detailed descriptions are omitted herein.

Different from the process shown in FIG. 3A to FIG. 3C, in the process shown in FIG. 4, the terminal device #1 may not determine a relationship between the network slice #A, a network slice supported by the cell #1, and an allowed network slice of the terminal device #1.

In other words, in the process shown in FIG. 4, a process in which the terminal device #1 determines the relationship between the network slice #A, the network slice supported by the cell #1, and the allowed network slice of the terminal device #1 is optional.

In another embodiment, in S222, another network device, for example, a UDM, sends the information #1 to the core network device #1. For example, the core network device #1 may send a query request to the UDM, where the query request is for requesting to send the information #1. For example, the query request may include information about the terminal device #1, the information about the network slice #A, and the like.

In an embodiment, in S230, the core network device may further determine whether the network slice #A belongs to the network slice supported by the cell #1. In addition, when a determining result is that the network slice #1 does not belong to the network slice supported by the cell #1, S221 or S222 is performed. Alternatively, when a determining result is that the network slice #1 does not belong to the network slice supported by the cell #1, S240 is performed.

In S240, the core network device #1 may control the terminal device #1 based on the information #1.

A process in which the core network device #1 may control the terminal device #1 based on the information #1 may be similar to the foregoing process in which the core network device #A controls the terminal device #A based on the information #C.

For example, the core network device #1 may perform network slice remapping on the service #A based on the information #1A. To be specific, the core network device #1 may remap the service #1 to a network slice #C. The network slice #C belongs to the network slice set #1, and the network slice #C belongs to the network slice set #2.

For another example, the core network device #1 may perform network slice fallback on the service #A based on the information #1B. To be specific, the core network device #1 may map the service #1 to a network slice #D (namely, an example of an initial network slice). The network slice #D may be a network slice that is pre-allocated by a network device (for example, the core network device) to the terminal device #1 and that is used for network slice fallback processing. In addition, the network slice #D may belong to the network slice set #1, or may not belong to the network slice set #1. In addition, the network slice #D may belong to the network slice set #2, or may not belong to the network slice set #2. This is not particularly limited in this application.

For another example, the core network device #A may perform cell redirection on the terminal device #A based on the information #1C. For example, the core network device #A may redirect the terminal device #A to a cell #3 (namely, an example of the second cell). The network slice #A may belong to a network slice supported by the cell #3.

For another example, the core network device #1 may remap the service #1 to the network slice #B based on the information #1D.

For another example, the core network device #1 may perform cell redirection on the terminal device #1 based on the information #1E, so that the terminal device #1 performs communication in the cell #2.

Figure 5:
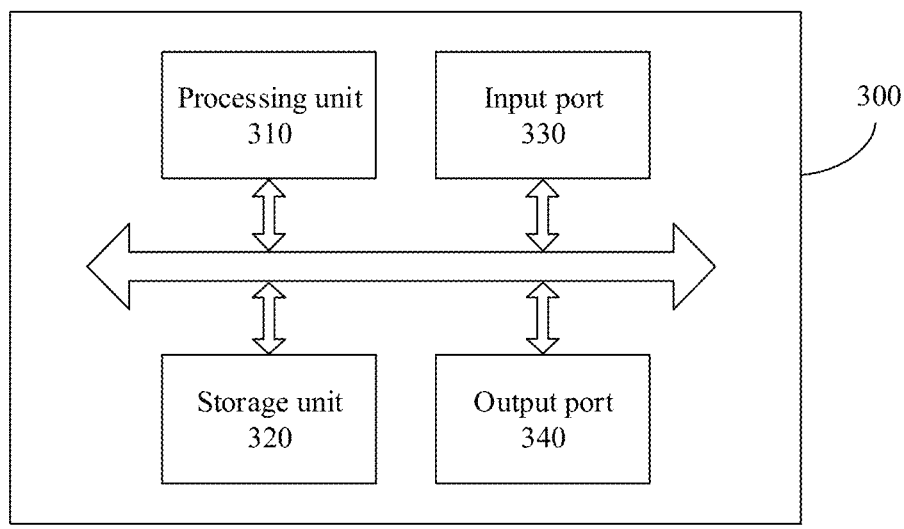
FIG. 5 is a schematic diagram of an example of a communication apparatus according to this application.

According to the foregoing method, FIG. 5 is a schematic diagram of a communication apparatus 300 according to an embodiment of this application.

The apparatus 300 may be a terminal device, or may be a chip or a circuit, for example, a chip or a circuit that may be disposed in a terminal device.

The apparatus 300 may include a processing unit 310 (and optionally, may further include a storage unit 320). The storage unit 320 is configured to store instructions.

In a possible manner, the processing unit 310 is configured to execute the instructions stored in the storage unit 320, to enable the apparatus 300 to implement the operations performed by the terminal device (for example, the terminal device #A or the terminal device #1) in the foregoing method.

Further, the apparatus 300 may further include an input port 330 (namely, an example of a communication unit) and an output port 330 (namely, another example of a transceiver unit). Further, the processing unit 310, the storage unit 320, the input port 330, and the output port 330 may communicate with each other through an internal connection path, to transmit a control signal and/or a data signal. The storage unit 320 is configured to store a computer program. The processing unit 310 may be configured to invoke the computer program from the storage unit 320 and run the computer program, to complete the operations performed by the terminal device in the foregoing method. The storage unit 320 may be integrated into the processing unit 310, or may be disposed separately from the processing unit 310.

In an embodiment, in a possible manner, the input port 330 may be a receiver, and the output port 340 is a transmitter. The receiver and the transmitter may be a same physical entity or different physical entities. When the receiver and the transmitter are the same physical entity, the receiver and the transmitter may be collectively referred to as a transceiver.

Optionally, in a possible manner, the input port 330 is an input interface, and the output port 340 is an output interface.

In an embodiment, it may be considered that functions of the input port 330 and the output port 340 are implemented by using a transceiver circuit or a dedicated transceiver chip. It may be considered that the processing unit 310 is implemented by using a dedicated processing chip, a processing circuit, a processing unit, or a general-purpose chip.

In another embodiment, it may be considered that the terminal device provided in this embodiment of this application is implemented by using a general-purpose computer. To be specific, program code for implementing functions of the processing unit 310, the input port 330, and the output port 340 is stored in the storage unit 320, and a general-purpose processing unit executes the code in the storage unit 320 to implement functions of the processing unit 310, the input port 330, and the output port 340.

When the apparatus 300 is the terminal device, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus. When data needs to be sent, the processor performs baseband processing on the to-be-sent data, and then outputs a baseband signal to the radio frequency circuit. The radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, the memory may also be referred to as a storage medium, a storage device, or the like. The memory may be disposed independent of the processor, or may be integrated with the processor. This is not limited in this embodiment of this application. In this case, the processor having a processing function may be considered as the processing unit 310 of the terminal device. The processing unit 310 may also be referred to as a processor, a processing board, a processing module, a processing apparatus, or the like. In addition, in this case, a receiver, a receiver circuit, or the like may be considered as the input port 330. A transmitter, a transmitter circuit, or the like may be considered as the output port 340.

When the communication apparatus 300 is the chip, the chip includes a transceiver circuit and a processing circuit. The transceiver circuit may be an input/output circuit or a communication interface. The processing circuit is a processor, a microprocessor, or an integrated circuit integrated on the chip. The input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments.

In an embodiment, the input port 330 is configured to: receive first information, where the first information indicates at least one supported network slice, the at least one supported network slice includes a network slice supported by a first cell and/or a network slice supported by a first access device, the first cell includes a cell currently accessed by the terminal device, and the first access device includes an access device currently accessed by the terminal device; and receive second information, where the second information indicates at least one allowed network slice.

The processing unit 310 is configured to process a session establishment request of a first service based on the first information and the second information.

In an embodiment, the processing unit 310 is configured to:
  if a first network slice belongs to the at least one supported network slice, and the first network slice belongs to the at least one allowed network slice, control the output port 340 to send the session establishment request of the first service, where the first network slice includes a network slice corresponding to the first service;
  if a first network slice does not belong to the at least one supported network slice, or a first network slice does not belong to the at least one allowed network slice, control the output port 340 to stop the session establishment request of the first service; or
  if a first network slice does not belong to the at least one supported network slice, or a first network slice does not belong to the at least one allowed network slice, control the output port 340 to send third information, where the third information indicates at least one of the following: whether the first service supports network slice remapping, whether the first service supports network slice fallback, whether the terminal device supports cell redirection, information about at least one second cell, information about at least one second access device, and information about at least one second network slice; the second cell supports the first network slice; the second access device supports the first network slice; and the second network slice belongs to the supported network slice.

Optionally, the processing unit 310 is configured to: send, at an AS, information about the at least one supported network slice to a NAS; determine, at the NAS, whether the first network slice belongs to the at least one supported network slice, where the first network slice includes the network slice corresponding to the first service; and determine, at the NAS, whether the first network slice belongs to the at least one allowed network slice.

In an embodiment, the processing unit 310 is configured to send, at a NAS, information about the first network slice to an AS, where the first network slice includes the network slice corresponding to the first service.

If the first network slice belongs to the at least one allowed network slice, the processing unit 310 is configured to send, at the NAS, the session establishment request of the first service to the AS.

If the first network slice belongs to the at least one supported network slice, the processing unit 310 controls, at the AS, the output port 340 to send the session establishment request of the first service.

If the first network slice does not belong to the at least one supported network slice, the processing unit 310 sends feedback information to the NAS at the AS, where the feedback information indicates that the first network slice does not belong to the at least one supported network slice.

In an embodiment, the processing unit 310 is configured to: send, at a NAS, information about the first network slice to an AS; where the first network slice includes the network slice corresponding to the first service; send, at the NAS, information about the at least one allowed network slice to the AS of the terminal device; and send, at the NAS, the session establishment request of the first service to the AS of the terminal device.

If the first network slice belongs to the at least one supported network slice, and the first network slice belongs to the at least one allowed network slice, optionally, the processing unit 310 controls, at the AS, the output port 340 to send the session establishment request of the first service.

If the first network slice does not belong to the at least one supported network slice, or the first network slice does not belong to the at least one allowed network slice, the processing unit 310 sends, at the AS, feedback information to the NAS of the terminal device, where the feedback information indicates that the first network slice does not belong to the at least one supported network slice.

Functions and actions of the modules or units in the apparatus 300 described above are merely examples for descriptions. When the apparatus 300 is configured in or is the terminal device, the modules or units in the apparatus 300 may be configured to perform actions or processing processes performed by the terminal device (for example, the terminal device #1 or the terminal device #A) in the foregoing method. Herein, to avoid repetition, detailed descriptions are omitted.

For concepts, explanations, detailed descriptions, and other steps of the apparatus 300 that are related to the technical solutions provided in embodiments of this application, refer to the descriptions of the content in the foregoing methods or other embodiments. Details are not described herein again.

Figure 6:
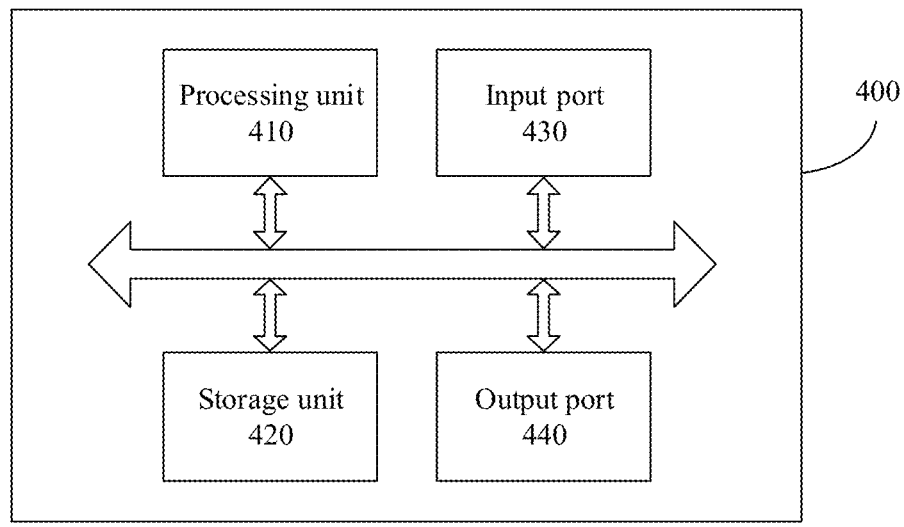
FIG. 6 is a schematic diagram of another example of a communication apparatus according to this application.

According to the foregoing method, FIG. 6 is a schematic diagram of a communication apparatus 400 according to an embodiment of this application.

The apparatus 400 may be a core network device, or may be a chip or a circuit, for example, a chip or a circuit that may be disposed in a core network device.

The apparatus 400 may include a processing unit 410 (namely, an example of a processing unit), and optionally, may further include a storage unit 420. The storage unit 420 is configured to store instructions.

In a possible manner, the processing unit 410 is configured to execute the instructions stored in the storage unit 420, to enable the apparatus 400 to implement the operations performed by the network device in the foregoing method.

Further, the apparatus 400 may further include an input port 430 (namely, an example of a communication unit) and an output port 440 (namely, another example of a transceiver unit). Further, the processing unit 410, the storage unit 420, the input port 430, and the output port 440 may communicate with each other through an internal connection path, to transmit a control signal and/or a data signal. The storage unit 420 is configured to store a computer program. The processing unit 410 may be configured to invoke the computer program from the storage unit 420 and run the computer program, to complete the operations performed by the network device in the foregoing method. The storage unit 420 may be integrated into the processing unit 410, or may be disposed separately from the processing unit 410.

In an embodiment, in a possible manner, the input port 430 may be a receiver, and the output port 440 is a transmitter. The receiver and the transmitter may be a same physical entity or different physical entities. When the receiver and the transmitter are the same physical entity, the receiver and the transmitter may be collectively referred to as a transceiver.

In an embodiment, in a possible manner, the input port 430 is an input interface, and the output port 440 is an output interface.

In an embodiment, it may be considered that functions of the input port 430 and the output port 440 are implemented by using a transceiver circuit or a dedicated transceiver chip. It may be considered that the processing unit 410 is implemented by using a dedicated processing chip, a processing circuit, a processing unit, or a general-purpose chip.

In another embodiment, it may be considered that the network device provided in this embodiment of this application is implemented by using a general-purpose computer. To be specific, program code for implementing functions of the processing unit 410, the input port 430, and the output port 440 is stored in the storage unit 420, and a general-purpose processing unit executes the code in the storage unit 420 to implement functions of the processing unit 410, the input port 430, and the output port 440.

When the apparatus 400 is the core network device, the core network device includes a processor, a memory, and an input/output apparatus. The processor is mainly configured to: process a communication protocol and communication data, control a terminal device, execute a software program, process data of the software program, and the like. The memory is mainly configured to store the software program and data. The input/output apparatus is configured to: receive data from another device (for example, an access network device or another core network device), and/or send data to the another device. In this case, the processor having a processing function may be considered as the processing unit 410 of the terminal device. The processing unit 410 may also be referred to as a processor, a processing board, a processing module, a processing apparatus, or the like. In addition, in this case, a receiver, a receiver circuit, or the like may be considered as the input port 430. A transmitter, a transmitter circuit, or the like may be considered as the output port 440.

When the communication apparatus 400 is the chip, the chip includes a transceiver circuit and a processing circuit. The transceiver circuit may be an input/output circuit or a communication interface. The processing circuit is a processor, a microprocessor, or an integrated circuit integrated on the chip. The input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments.

In an embodiment, the input port 430 is configured to obtain indication information, where the indication information indicates at least one of the following:
whether a first service corresponding to a terminal device supports network slice remapping, whether the first service supports network slice fallback, whether the terminal device supports cell redirection, information about at least one second cell, information about at least one second access device, and information about at least one second network slice.

The second cell supports a first network slice, the second access device supports the first network slice, and the second network slice belongs to a supported network slice.

The processing unit 410 is configured to communicate with the terminal device based on the indication information.

In an embodiment, the input port 430 is configured to receive the indication information from the terminal device.

In an embodiment, the processing unit 410 is configured to determine, from a plurality of processing manners based on the indication information, a first processing manner that satisfies a case indicated by the indication information.

The core network device communicates with the terminal device based on the first processing manner.

In an embodiment, the plurality of processing manners include at least two of the following processing manners:
performing network slice remapping on the first service;
remapping the first service to the second network slice;
performing network slice fallback on the first service;
performing cell redirection on the terminal device;
redirecting the terminal device to the second cell; and
redirecting the terminal device to a cell of the second access device.

In an embodiment, the processing unit 410 is configured to determine the first processing manner based on the indication information and a priority of each of the plurality of processing manners.

In an embodiment, the indication information is carried in a session establishment request of the first service.

Functions and actions of the modules or units in the apparatus 400 described above are merely examples for descriptions. When the apparatus 400 is configured in or is the core network device, the modules or units in the apparatus 400 may be configured to perform actions or processing processes performed by the core network device (for example, the core network device #1 or the core network device #A) in the foregoing method. Herein, to avoid repetition, detailed descriptions are omitted.

For concepts, explanations, detailed descriptions, and other steps of the apparatus 400 that are related to the technical solutions provided in embodiments of this application, refer to the descriptions of the content in the foregoing methods or other embodiments. Details are not described herein again.

Figure 7:
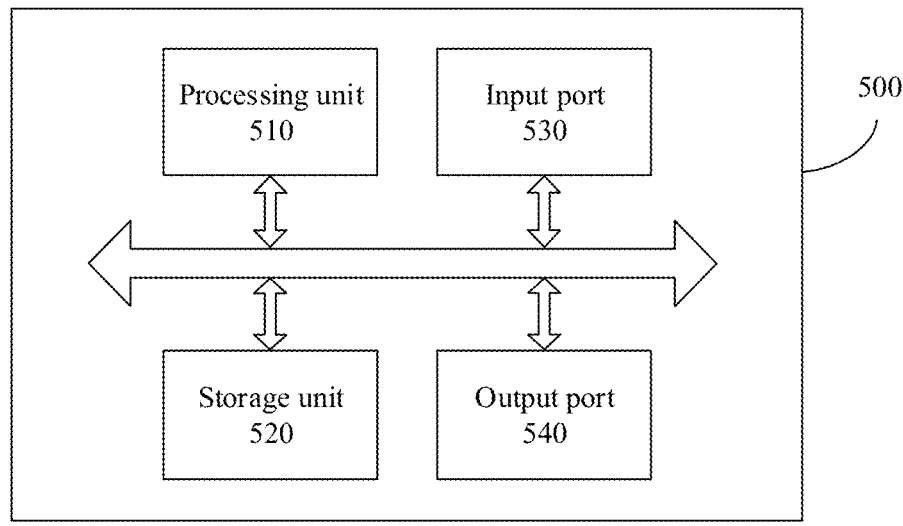
FIG. 7 is a schematic diagram of still another example of a communication apparatus according to this application.

According to the foregoing method, FIG. 7 is a schematic diagram of a communication apparatus 500 according to an embodiment of this application.

The apparatus 500 may be a terminal device, or may be a chip or a circuit, for example, a chip or a circuit that may be disposed in a terminal device.

The apparatus 500 may include a processing unit 510 (namely, an example of a processing unit), and optionally, may further include a storage unit 520. The storage unit 520 is configured to store instructions.

In a possible manner, the processing unit 510 is configured to execute the instructions stored in the storage unit 520, to enable the apparatus 300 to implement the operations performed by the terminal device (for example, the terminal device #1) in the foregoing method.

Further, the apparatus 500 may further include an input port 530 (namely, an example of a communication unit) and an output port 530 (namely, another example of a transceiver unit). Further, the processing unit 510, the storage unit 520, the input port 530, and the output port 530 may communicate with each other through an internal connection path, to transmit a control signal and/or a data signal. The storage unit 520 is configured to store a computer program. The processing unit 510 may be configured to invoke the computer program from the storage unit 520 and run the computer program, to complete the operations performed by the terminal device in the foregoing method. The storage unit 520 may be integrated into the processing unit 510, or may be disposed separately from the processing unit 510.

In an embodiment, in a possible manner, the input port 530 may be a receiver, and the output port 540 is a transmitter. The receiver and the transmitter may be a same physical entity or different physical entities. When the receiver and the transmitter are the same physical entity, the receiver and the transmitter may be collectively referred to as a transceiver.

In an embodiment, in a possible manner, the input port 530 is an input interface, and the output port 540 is an output interface.

In an embodiment, it may be considered that functions of the input port 530 and the output port 540 are implemented by using a transceiver circuit or a dedicated transceiver chip. It may be considered that the processing unit 510 is implemented by using a dedicated processing chip, a processing circuit, a processing unit, or a general-purpose chip.

In another embodiment, it may be considered that the terminal device provided in this embodiment of this application is implemented by using a general-purpose computer. To be specific, program code for implementing functions of the processing unit 510, the input port 530, and the output port 540 is stored in the storage unit 520, and a general-purpose processing unit executes the code in the storage unit 520 to implement functions of the processing unit 510, the input port 530, and the output port 540.

When the apparatus 500 is the terminal device, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus. When data needs to be sent, the processor performs baseband processing on the to-be-sent data, and then outputs a baseband signal to the radio frequency circuit. The radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, the memory may also be referred to as a storage medium, a storage device, or the like. The memory may be disposed independent of the processor, or may be integrated with the processor. This is not limited in this embodiment of this application. In this case, the processor having a processing function may be considered as the processing unit 510 of the terminal device. The processing unit 510 may also be referred to as a processor, a processing board, a processing module, a processing apparatus, or the like. In addition, in this case, a receiver, a receiver circuit, or the like may be considered as the input port 530. A transmitter, a transmitter circuit, or the like may be considered as the output port 540.

When the communication apparatus 500 is the chip, the chip includes a transceiver circuit and a processing circuit. The transceiver circuit may be an input/output circuit or a communication interface. The processing circuit is a processor, a microprocessor, or an integrated circuit integrated on the chip. The input circuit may be an input pin, the output circuit may be an output pin, and the processing circuit may be a transistor, a gate circuit, a flip-flop, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be different circuits, or may be a same circuit. In this case, the circuit is used as the input circuit and the output circuit at different moments.

In an embodiment, the processing unit 510 is configured to generate indication information, where the indication information indicates at least one of the following:

whether a first service corresponding to the terminal device supports network slice remapping, whether the first service supports network slice fallback, whether the terminal device supports cell redirection, information about at least one second cell, information about at least one second access device, and information about at least one second network slice.

The second cell supports a first network slice, the second access device supports the first network slice, and the second network slice belongs to a supported network slice.

The output port 540 is configured to send the indication information.

Optionally, the indication information is carried in a session establishment request of the first service.

Functions and actions of the modules or units in the apparatus 500 described above are merely examples for descriptions. When the apparatus 500 is configured in or is the terminal device, the modules or units in the apparatus 500 may be configured to perform actions or processing processes performed by the terminal device (for example, the terminal device #1) in the foregoing method. Herein, to avoid repetition, detailed descriptions are omitted.

For concepts, explanations, detailed descriptions, and other steps of the apparatus 500 that are related to the technical solutions provided in embodiments of this application, refer to the descriptions of the content in the foregoing methods or other embodiments. Details are not described herein again.

Figure 8:
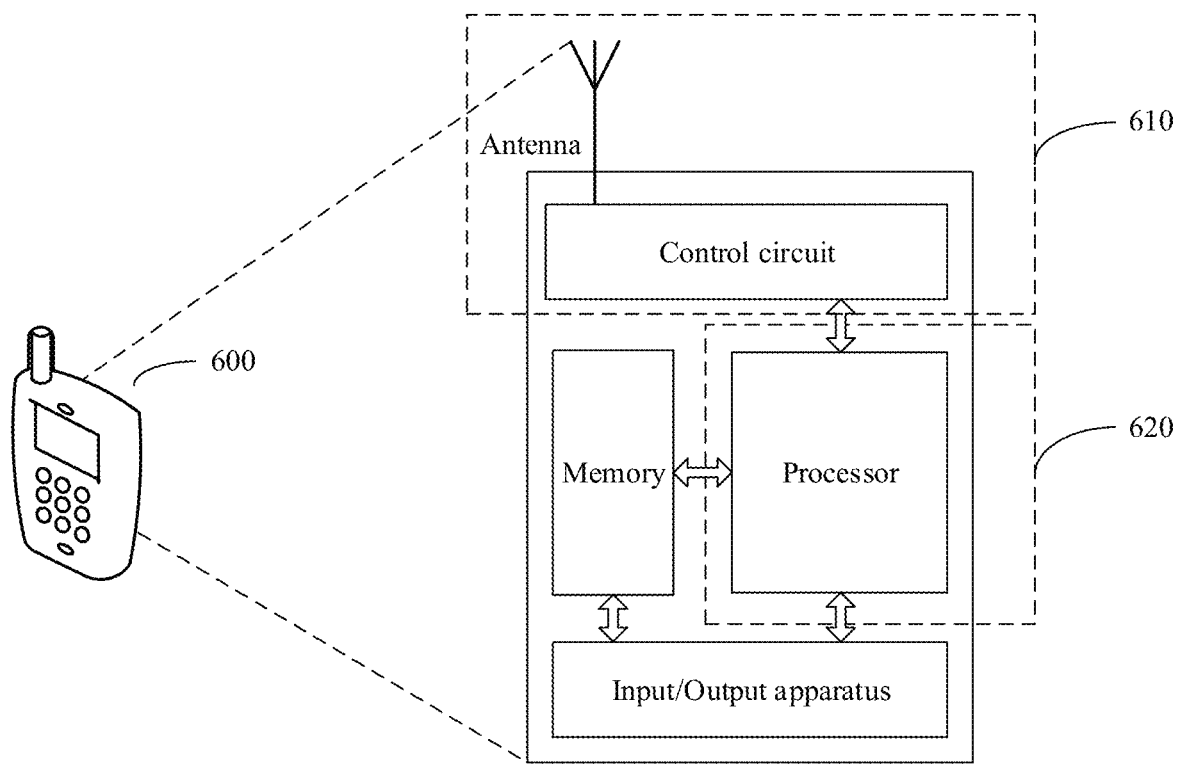
FIG. 8 is a schematic diagram of an example of a terminal device according to this application.

FIG. 8 is a schematic diagram of a structure of a terminal device 600 according to this application. The apparatus 300 or 500 may be configured in the terminal device 600, or the apparatus 300 or 500 may be the terminal device 600. In other words, the terminal device 600 may perform the actions performed by the terminal device (for example, the terminal device #1 or the terminal device #A) in the foregoing methods.

For ease of description, FIG. 8 shows only main components of the terminal device. As shown in FIG. 8, the terminal device 600 includes a processor, a memory, a control circuit, an antenna, and an input/output apparatus.

The processor is mainly configured to process a communication protocol and communication data, control the entire terminal device, execute a software program, and process data of the software program, for example, is configured to support the terminal device in performing the actions described in the foregoing embodiments of the indication method for transmitting a precoding matrix. The memory is mainly configured to store the software program and the data, for example, store a codebook described in the foregoing embodiments. The control circuit is mainly configured to perform conversion between a baseband signal and a radio frequency signal and process the radio frequency signal. The control circuit and the antenna may collectively be referred to as a transceiver, and are mainly configured to receive and send a radio frequency signal in a form of an electromagnetic wave. The input/output apparatus, for example, a touchscreen, a display, or a keyboard, is mainly configured to: receive data input by a user and output data to the user.

After the terminal device is powered on, the processor may read the software program in the storage unit, interpret and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 8 shows only one memory and one processor. In an actual terminal device, there may be a plurality of processors and memories. The memory may also be referred to as a storage medium, a storage device, or the like. This is not limited in this embodiment of this application.

For example, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 8 integrates functions of the baseband processor and the central processing unit. A person skilled in the art may understand that the baseband processor and the central processing unit may be separate processors, and are interconnected through a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of this application, the antenna that has receiving and sending functions and the control circuit may be considered as a transceiver unit 610 of the terminal device 600, and the processor that has a processing function may be considered as a processing unit 620 of the terminal device 600. As shown in FIG. 8, the terminal device 600 includes the transceiver unit 610 and the processing unit 620. The transceiver unit may also be referred to as a transceiver, a transceiver apparatus, or the like. Optionally, a component that is in the transceiver unit 610 and that is configured to implement a receiving function may be considered as a receiving unit, and a component that is in the transceiver unit 610 and that is configured to implement a sending function may be considered as a sending unit. In other words, the transceiver unit includes a receiving unit and a sending unit. For example, the receiving unit may also be referred to as a receiver, a receive circuit, or the like, and the sending unit may be referred to as a transmitter, a transmit circuit, or the like.

According to the method provided in embodiments of this application, an embodiment of this application further provides a communication system, including one or more of the foregoing terminal devices and network devices.

It should be understood that, in embodiments of this application, the processor may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example and not limitation, many forms of random access memory (RAM) may be used, for example, a static random access memory (SRAM), a dynamic random access memory (DRAM), a synchronous dynamic random access memory (SDRAM), a double data rate synchronous dynamic random access memory DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any combination thereof. When software is used to implement embodiments, all or some of the foregoing embodiments may be implemented in a form of a computer program product. The computer program product includes one or more computer instructions or computer programs. When the program instructions or the computer programs are loaded and executed on the computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be noted that the term "and/or" describes an association relationship between associated objects and indicates that three relationships may exist. For example, A and/or B may indicate the following cases: Only A exists, both A and B exist, and only B exists. In addition, the character "/" generally indicates an "or" relationship between the associated objects.

It should be understood that sequence numbers of the foregoing processes do not mean execution sequences in various embodiments of this application. The execution sequences of the processes should be determined based on functions and internal logic of the processes, but should not be construed as any limitation on the implementation processes in embodiments of this application.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments, and details are not described herein again. In the several embodiments provided in this application, it should be understood that the disclosed system, the apparatus, and the method may be implemented in other manners. For example, the described apparatus embodiment is merely an example. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments. In addition, functional units in embodiments of this application may be integrated into one processing unit, or each of the units may exist alone physically, or two or more units may be integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
 receiving, by a terminal device, first information indicating at least one supported network slice, wherein the at least one supported network slice comprises a network slice supported by a first cell currently accessed by the terminal device or by a first access device currently accessed by the terminal device;
 receiving, by the terminal device, second information indicating at least one allowed network slice; and
 processing, by the terminal device, a session establishment request of a first service based on the first information and the second information, the processing further comprising at least one of the following:
 if a first network slice belongs to the at least one supported network slice and the at least one allowed network slice, sending the session establishment request of the first service, wherein the first network slice corresponds to the first service; and
 if a first network slice does not belong to the at least one supported network slice or the at least one allowed network slice, stopping the session establishment request of the first service.

2. The method according to claim 1, further comprising:
 if a first network slice does not belong to the at least one supported network slice or the at least one allowed network slice, sending third information indicating at least one of the following:
 that the first service supports network slice remapping,
 that the first service supports network slice fallback, or
 if the terminal device supports cell redirection, information about at least one second cell, information about at least one second access device, and information about at least one second network slice, wherein the second cell supports the first network slice, the second access device supports the first network slice, and the second network slice belongs to the supported network slice.

3. The method according to claim 1, wherein receiving the first information comprises:
 receiving, by an access stratum (AS) of the terminal device, the first information; and
 wherein receiving the second information comprises:
 receiving, by a non-access stratum (NAS) of the terminal device, the second information.

4. The method according to claim 3, further comprising:
 sending, by the AS of the terminal device, information about the at least one supported network slice to the NAS of the terminal device;
 determining, by the NAS of the terminal device, if the first network slice belongs to the at least one supported network slice, wherein the first network slice corresponds to the first service; and
 determining, by the NAS of the terminal device, if the first network slice belongs to the at least one allowed network slice.

5. The method according to claim 3, further comprising:
 sending, by the NAS of the terminal device, information about the first network slice to the AS of the terminal device, wherein the first network slice corresponds to the first service; and
 if the first network slice belongs to the at least one allowed network slice, sending, by the NAS of the terminal device, the session establishment request of the first service to the AS of the terminal device.

6. The method according to claim 5, further comprising:
 if the first network slice belongs to the at least one supported network slice, sending, by the AS of the terminal device, the session establishment request of the first service; and
 if the first network slice does not belong to the at least one supported network slice, sending, by the AS of the terminal device, feedback information to the NAS of the terminal device, wherein the feedback information indicates that the first network slice does not belong to the at least one supported network slice.

7. The method according to claim 3, further comprising:
 sending, by the NAS of the terminal device, information about the first network slice to the AS of the terminal device, wherein the first network slice corresponds to the first service;
 sending, by the NAS of the terminal device, information about the at least one allowed network slice to the AS of the terminal device; and
 sending, by the NAS of the terminal device, the session establishment request of the first service to the AS of the terminal device.

8. The method according to claim 7, further comprising:
 if the first network slice belongs to the at least one supported network slice and the at least one allowed network slice, sending, by the AS of the terminal device, the session establishment request of the first service; and
 if the first network slice does not belong to the at least one supported network slice or the at least one allowed network slice, sending, by the AS of the terminal device, feedback information to the NAS of the terminal device, wherein the feedback information indicates that the first network slice does not belong to the at least one supported network slice.

9. A communication method, comprising:
 obtaining, by a core network device, indication information, wherein the indication information indicates at least one of the following:
 that a first service corresponding to a terminal device supports network slice remapping,
 that the first service supports network slice fallback, or
 if the terminal device supports cell redirection, information about at least one second cell, information about at least one second access device, and information about at least one second network slice, wherein the second cell supports a first network slice, the second access device supports the first network slice, and the second network slice belongs to a supported network slice; and communicating, by the core network device, with the terminal device based on the indication information, the communicating further comprising:

determining, by the core network device from a plurality of processing manners based on the indication information, a first processing manner that satisfies a case indicated by the indication information; and communicating, by the core network device, with the terminal device based on the first processing manner.

10. The method according to claim 9, wherein obtaining the indication information comprises:

receiving, by the core network device, the indication information from the terminal device.

11. The method according to claim 9, wherein the plurality of processing manners comprise at least two of the following processing manners:

performing network slice remapping on the first service; remapping the first service to the second network slice; performing network slice fallback on the first service; performing cell redirection on the terminal device; redirecting the terminal device to the second cell; or redirecting the terminal device to a cell of the second access device.

12. The method according to claim 9, wherein determining the first processing manner that satisfies a case indicated by the indication information comprises:

determining, by the core network device, the first processing manner based on the indication information and a priority of each of the plurality of processing manners.

13. A communication apparatus operating as part of a terminal device, comprising:

a transceiver configured to:
receive first information indicating at least one supported network slice, wherein the at least one supported network slice comprises a network slice supported by a first cell currently accessed by the terminal device or by a first access device currently accessed by the terminal device; and
receive second information indicating at least one allowed network slice; and a processor configured to process a session establishment request of a first service based on the first information and the second information, the processor further configured to perform at least one of the following operations:

if a first network slice belongs to the at least one supported network slice and the at least one allowed network slice, control the transceiver to send the session establishment request of the first service, wherein the first network slice corresponds to the first service; and if a first network slice does not belong to the at least one supported network slice or the at least one allowed network slice, control the transceiver to stop the session establishment request of the first service.

14. The apparatus according to claim 13, wherein the processor is configured to:

if a first network slice does not belong to the at least one supported network slice or the at least one allowed network slice, control the transceiver to send third information, wherein the third information indicates at least one of the following:

that the first service supports network slice remapping, that the first service supports network slice fallback, or if the terminal device supports cell redirection, information about at least one second cell, information about at least one second access device, and information about at least one second network slice, wherein the second cell supports the first network slice, the second access device supports the first network slice, and the second network slice belongs to the supported network slice.

15. The apparatus according to claim 13, wherein the transceiver receives the first information at an access stratum (AS), and receives the second information at a non-access stratum (NAS).

16. The apparatus according to claim 15, wherein the processor is configured to:

send, at the AS, information about the at least one supported network slice to the NAS;

determine, at the NAS, if the first network slice belongs to the at least one supported network slice, wherein the first network slice corresponds to the first service; and determine, at the NAS, if the first network slice belongs to the at least one allowed network slice.

17. The apparatus according to claim 15, wherein the processor is configured to:

send, at the NAS, information about the first network slice to the AS, wherein the first network slice corresponds to the first service;

if the first network slice belongs to the at least one allowed network slice, send, at the NAS, the session establishment request of the first service to the AS; and if the first network slice belongs to the at least one supported network slice, control the transceiver to send the session establishment request of the first service at the AS; or if the first network slice does not belong to the at least one supported network slice, send feedback information to the NAS at the AS, wherein the feedback information indicates that the first network slice does not belong to the at least one supported network slice.

18. The apparatus according to claim 15, wherein the processor is configured to:

send, at the NAS, information about the first network slice to the AS, wherein the first network slice corresponds to the first service;

send, at the NAS, information about the at least one allowed network slice to the AS of the terminal device;

send, at the NAS, the session establishment request of the first service to the AS of the terminal device; and if the first network slice belongs to the at least one supported network slice and the at least one allowed network slice, control the transceiver to send the session establishment request of the first service at the AS; or if the first network slice does not belong to the at least one supported network slice or the at least one allowed network slice, send feedback information to the NAS at the AS, wherein the feedback information indicates that the first network slice does not belong to the at least one supported network slice.

* * * * *